US008613020B2

(12) United States Patent
Knudson et al.

(10) Patent No.: US 8,613,020 B2
(45) Date of Patent: Dec. 17, 2013

(54) PROGRAM GUIDE SYSTEM WITH FLIP AND BROWSE ADVERTISEMENTS

(75) Inventors: Edward Knudson, Littleton, CO (US); Joel Hassell, Arvada, CO (US); Connie Marshall, Muskogee, OK (US); Thomas Lemmons, Sand Springs, OK (US); Steven Reynolds, Littleton, CO (US); Robert Knee, Lansdale, PA (US); Kenneth Carpenter, Jr., Mt. Laurel, NJ (US); William Thomas, Bixby, OK (US); W. Benjamin Herrington, Tulsa, OK (US); Steven Williamson, Broken Arrow, OK (US); Michael Ellis, Boulder, CO (US); Donald Allison, Tulsa, OK (US)

(73) Assignee: United Video Properties, Inc., Tulsa, OK (US)

( * ) Notice: Subject to any disclaimer, the term of this patent is extended or adjusted under 35 U.S.C. 154(b) by 599 days.

(21) Appl. No.: 11/371,490

(22) Filed: Mar. 8, 2006

(65) Prior Publication Data
US 2006/0156336 A1  Jul. 13, 2006

Related U.S. Application Data

(63) Continuation of application No. 10/127,220, filed on Apr. 19, 2002, now Pat. No. 7,039,935, which is a continuation of application No. 09/070,555, filed on Apr. 30, 1998, now Pat. No. 6,564,379.

(51) Int. Cl.
*H04N 5/445* (2011.01)
(52) U.S. Cl.
USPC ............... 725/42; 725/37; 725/39; 725/40; 725/43; 725/52

(58) Field of Classification Search
USPC ............................................. 725/39–47
See application file for complete search history.

(56) References Cited

U.S. PATENT DOCUMENTS 3,440,427 A   4/1969   Kammer
3,492,577 A   1/1970   Reiter et al.
(Continued)

FOREIGN PATENT DOCUMENTS

AU   56198-98   7/1998
AU   731010     7/1998
(Continued)

OTHER PUBLICATIONS

2720R Satellite Receiver User's Guide, General Instrument, 1991, pp. 58-61.
(Continued)

*Primary Examiner* — Nasser Goodarzi
*Assistant Examiner* — Kyu Chae
(74) *Attorney, Agent, or Firm* — Ropes & Gray LLP

(57) ABSTRACT

An interactive television program guide is provided in which advertisements may be displayed in program listings display regions on program guide screens. The program listings display regions may be browse displays or flip displays. The program guide screens contain video for the current channel to which the user is tuned. The program listings display regions containing the advertisements may be overlaid on top of the current channel. Alternatively, the video for the current channel may be provided in a reduced-size video window. The advertisements may contain video. The advertisements may be used to promote television programs and conventional goods and services. Advertisements may be selectable. When a user selects an advertisement, the program guide provides the user with an opportunity to order products or services, request information, set reminders for upcoming programs, view program descriptions, record programs, or take other such actions.

18 Claims, 14 Drawing Sheets

(56) References Cited

U.S. PATENT DOCUMENTS

| | | |
|---|---|---|
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,070,693 A | 1/1978 | Shutterly |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,276,597 A | 6/1981 | Dissly et al. |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga et al. |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,959,720 A | 9/1990 | Duffield et al. |
| 4,963,994 A | 10/1990 | Levine |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,003,384 A | 3/1991 | Durden et al. |

| Patent No. | Date | Inventor |
|---|---|---|
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |
| 5,038,211 A | 8/1991 | Hallenbeck |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,083,800 A | 1/1992 | Lockton |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura |
| 5,148,154 A | 9/1992 | MacKay et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,023 A | 11/1992 | Keenan |
| 5,162,905 A | 11/1992 | Itoh et al. |
| 5,170,388 A | 12/1992 | Endoh et al. |
| 5,172,111 A | 12/1992 | Olivo, Jr. |
| 5,177,604 A | 1/1993 | Martinez |
| 5,179,654 A | 1/1993 | Richards et al. |
| 5,195,092 A | 3/1993 | Wilson et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,999 A | 11/1993 | Wyman |
| 5,283,639 A | 2/1994 | Esch et al. |
| 5,283,819 A | 2/1994 | Glick et al. |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,343,239 A | 8/1994 | Lappington et al. |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,373,288 A | 12/1994 | Blahut |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,398,074 A | 3/1995 | Duffield et al. |
| 5,404,393 A | 4/1995 | Remillard |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,416,508 A | 5/1995 | Sakuma et al. |
| 5,424,770 A | 6/1995 | Schmelzer et al. |
| 5,425,101 A | 6/1995 | Woo et al. |
| 5,432,561 A | 7/1995 | Strubbe |
| 5,434,626 A | 7/1995 | Hayashi et al. |
| 5,436,676 A | 7/1995 | Pint et al. |
| 5,438,372 A | 8/1995 | Tsumori et al. |
| 5,440,678 A | 8/1995 | Eisen et al. |
| 5,446,919 A | 8/1995 | Wilkins |
| 5,452,012 A | 9/1995 | Saitoh |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo |
| 5,485,221 A | 1/1996 | Banker et al. |
| 5,488,409 A | 1/1996 | Yuen et al. |
| 5,495,295 A | 2/1996 | Long |
| 5,502,504 A | 3/1996 | Marshall et al. |
| 5,515,098 A | 5/1996 | Carles |
| 5,523,794 A | 6/1996 | Mankovitz et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,526,257 A | 6/1996 | Lerner |
| 5,528,304 A | 6/1996 | Cherrick et al. |
| 5,532,735 A | 7/1996 | Blahut et al. |
| 5,532,754 A | 7/1996 | Young et al. |
| 5,534,911 A | 7/1996 | Levitan |
| 5,537,141 A | 7/1996 | Harper et al. |
| 5,539,479 A | 7/1996 | Bertram |
| 5,539,822 A | 7/1996 | Lett |
| 5,541,662 A | 7/1996 | Adams et al. |
| 5,541,738 A | 7/1996 | Mankovitz |
| 5,550,576 A | 8/1996 | Klosterman |
| 5,557,338 A | 9/1996 | Maze et al. |
| 5,557,721 A | 9/1996 | Fite et al. |
| 5,559,548 A * | 9/1996 | Davis et al. ..................... 725/40 |
| 5,559,549 A | 9/1996 | Hendricks et al. |
| 5,559,550 A | 9/1996 | Mankovitz |
| 5,559,942 A | 9/1996 | Gough et al. |
| 5,561,471 A | 10/1996 | Kim |
| 5,570,295 A | 10/1996 | Isenberg et al. |
| 5,572,442 A | 11/1996 | Schulhof et al. |
| 5,574,962 A | 11/1996 | Fardeau et al. |
| 5,579,055 A | 11/1996 | Hamilton et al. |
| 5,581,479 A | 12/1996 | McLaughlin et al. |
| 5,582,364 A | 12/1996 | Trulin et al. |
| 5,583,560 A | 12/1996 | Florin et al. |
| 5,583,563 A | 12/1996 | Wanderscheid et al. |

| Patent | Date | Inventor(s) |
|---|---|---|
| 5,585,838 A | 12/1996 | Lawler et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,602,598 A | 2/1997 | Shintani |
| 5,606,374 A | 2/1997 | Bertram |
| 5,608,448 A | 3/1997 | Smoral et al. |
| 5,610,653 A | 3/1997 | Abecassis |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,623,613 A | 4/1997 | Rowe et al. |
| 5,627,940 A | 5/1997 | Rohra et al. |
| 5,629,733 A | 5/1997 | Youman et al. |
| 5,630,119 A | 5/1997 | Aristides et al. |
| 5,631,995 A | 5/1997 | Weissensteiner et al. |
| 5,633,683 A | 5/1997 | Rosengren et al. |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,659,350 A | 8/1997 | Hendricks et al. |
| 5,659,366 A | 8/1997 | Kerman |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. |
| 5,682,195 A | 10/1997 | Hendricks et al. |
| 5,682,206 A | 10/1997 | Wehmeyer et al. |
| 5,686,954 A | 11/1997 | Yoshinobu et al. |
| 5,687,331 A | 11/1997 | Volk et al. |
| 5,689,648 A | 11/1997 | Diaz et al. |
| 5,689,666 A | 11/1997 | Berquist et al. |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,708,478 A | 1/1998 | Tognazzini |
| 5,710,601 A | 1/1998 | Marshall et al. |
| 5,710,815 A | 1/1998 | Ming et al. |
| 5,715,314 A | 2/1998 | Payne et al. |
| 5,715,399 A | 2/1998 | Bezos |
| 5,717,452 A | 2/1998 | Janin et al. |
| 5,721,829 A | 2/1998 | Dunn et al. |
| 5,724,521 A | 3/1998 | Dedrick |
| 5,724,525 A | 3/1998 | Beyers et al. |
| 5,727,060 A | 3/1998 | Young |
| 5,727,163 A | 3/1998 | Bezos |
| 5,731,844 A | 3/1998 | Rauch et al. |
| 5,734,444 A | 3/1998 | Yoshinobu |
| 5,734,853 A | 3/1998 | Hendricks et al. |
| 5,734,893 A | 3/1998 | Li |
| 5,737,028 A | 4/1998 | Bertram et al. |
| 5,737,030 A | 4/1998 | Hong et al. |
| 5,740,549 A | 4/1998 | Reilly et al. |
| 5,749,043 A | 5/1998 | Worthy |
| 5,751,282 A | 5/1998 | Girard et al. |
| 5,752,159 A | 5/1998 | Faust et al. |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,768,528 A | 6/1998 | Stumm |
| 5,774,170 A | 6/1998 | Hite et al. |
| 5,774,534 A | 6/1998 | Mayer |
| 5,774,887 A | 6/1998 | Wolff et al. |
| 5,778,182 A | 7/1998 | Cathey et al. |
| 5,781,226 A | 7/1998 | Sheehan |
| 5,781,245 A | 7/1998 | Van Der Weij et al. |
| 5,781,246 A | 7/1998 | Alten et al. |
| 5,790,202 A | 8/1998 | Kummer et al. |
| 5,790,426 A | 8/1998 | Robinson |
| 5,790,835 A | 8/1998 | Case et al. |
| 5,790,935 A | 8/1998 | Payton |
| 5,793,409 A | 8/1998 | Tetsumura |
| 5,793,438 A | 8/1998 | Bedard |
| 5,793,964 A | 8/1998 | Rogers et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,808,608 A | 9/1998 | Young et al. |
| 5,808,694 A | 9/1998 | Usui et al. |
| 5,809,204 A | 9/1998 | Young et al. |
| 5,812,205 A | 9/1998 | Milnes et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,541 A | 10/1998 | Matsuura et al. |
| 5,819,019 A | 10/1998 | Nelson |
| 5,819,156 A | 10/1998 | Belmont |
| 5,819,284 A | 10/1998 | Farber et al. |
| 5,822,123 A | 10/1998 | Davis et al. |
| 5,828,402 A | 10/1998 | Collings |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,838,314 A | 11/1998 | Neel et al. |
| 5,842,010 A | 11/1998 | Jain et al. |
| 5,842,199 A | 11/1998 | Miller et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A | 12/1998 | LaJoie et al. |
| 5,862,292 A | 1/1999 | Kubota et al. |
| 5,867,226 A | 2/1999 | Wehmeyer et al. |

| | | | |
|---|---|---|---|
| 5,867,227 A | 2/1999 | Yamaguchi | |
| 5,870,543 A | 2/1999 | Ronning | |
| 5,872,588 A | 2/1999 | Aras et al. | |
| 5,874,985 A | 2/1999 | Matthews, III | |
| 5,880,768 A | 3/1999 | Lemmons et al. | |
| 5,883,677 A | 3/1999 | Hofmann | |
| 5,886,691 A | 3/1999 | Furuya et al. | |
| 5,886,731 A | 3/1999 | Ebisawa | |
| 5,892,498 A | 4/1999 | Marshall et al. | |
| 5,892,535 A | 4/1999 | Allen et al. | |
| 5,900,905 A | 5/1999 | Shoff et al. | |
| 5,903,314 A | 5/1999 | Niijima et al. | |
| 5,903,816 A | 5/1999 | Broadwin et al. | |
| 5,905,497 A | 5/1999 | Vaughan et al. | |
| 5,907,323 A | 5/1999 | Lawler et al. | |
| 5,907,366 A | 5/1999 | Farmer et al. | |
| 5,914,746 A | 6/1999 | Matthews, III et al. | |
| 5,917,481 A | 6/1999 | Rzeszewski et al. | |
| 5,917,830 A | 6/1999 | Chen et al. | |
| 5,918,014 A | 6/1999 | Robinson | |
| 5,920,700 A | 7/1999 | Gordon et al. | |
| 5,929,849 A | 7/1999 | Kikinis | |
| 5,929,850 A | 7/1999 | Broadwin et al. | |
| 5,936,679 A | 8/1999 | Kasahara et al. | |
| 5,940,073 A * | 8/1999 | Klosterman et al. | 715/721 |
| 5,940,572 A | 8/1999 | Balaban et al. | |
| 5,945,988 A | 8/1999 | Williams et al. | |
| 5,951,642 A | 9/1999 | Onoe et al. | |
| 5,953,005 A | 9/1999 | Liu | |
| 5,959,688 A | 9/1999 | Schein et al. | |
| 5,960,411 A | 9/1999 | Hartman et al. | |
| 5,974,222 A | 10/1999 | Yuen et al. | |
| 5,977,964 A | 11/1999 | Williams et al. | |
| 5,986,650 A | 11/1999 | Ellis et al. | |
| 5,988,078 A | 11/1999 | Levine | |
| 5,990,890 A | 11/1999 | Etheredge | |
| 5,990,927 A | 11/1999 | Hendricks et al. | |
| 5,999,912 A | 12/1999 | Wodarz et al. | |
| 6,002,393 A | 12/1999 | Hite et al. | |
| 6,002,394 A * | 12/1999 | Schein et al. | 725/39 |
| 6,005,562 A | 12/1999 | Shiga et al. | |
| 6,005,565 A | 12/1999 | Legall et al. | |
| 6,005,597 A | 12/1999 | Barrett et al. | |
| 6,006,257 A | 12/1999 | Slezak | |
| 6,008,802 A | 12/1999 | Iki | |
| 6,011,546 A | 1/2000 | Bertram | |
| 6,014,137 A | 1/2000 | Burns | |
| 6,014,502 A | 1/2000 | Moraes | |
| 6,016,141 A | 1/2000 | Knudson et al. | |
| 6,018,372 A | 1/2000 | Etheredge | |
| 6,018,768 A | 1/2000 | Ullman et al. | |
| 6,020,883 A | 2/2000 | Herz et al. | |
| 6,020,929 A | 2/2000 | Marshall et al. | |
| 6,025,837 A | 2/2000 | Matthews, III et al. | |
| 6,025,886 A | 2/2000 | Koda | |
| 6,028,599 A | 2/2000 | Yuen et al. | |
| 6,028,600 A | 2/2000 | Rosin et al. | |
| 6,029,045 A | 2/2000 | Picco et al. | |
| 6,029,176 A | 2/2000 | Cannon | |
| 6,029,195 A | 2/2000 | Herz | |
| 6,035,304 A | 3/2000 | Machida et al. | |
| 6,047,317 A | 4/2000 | Bisdikian et al. | |
| 6,049,824 A | 4/2000 | Simonin | |
| 6,052,145 A | 4/2000 | Macrae et al. | |
| 6,061,060 A | 5/2000 | Berry et al. | |
| 6,061,082 A | 5/2000 | Park | |
| 6,061,097 A | 5/2000 | Satterfield | |
| 6,064,376 A | 5/2000 | Berezowski et al. | |
| 6,064,980 A | 5/2000 | Jacobi et al. | |
| 6,067,303 A | 5/2000 | Aaker et al. | |
| 6,072,460 A | 6/2000 | Marshall et al. | |
| 6,075,551 A | 6/2000 | Berezowski et al. | |
| 6,075,575 A | 6/2000 | Schein et al. | |
| 6,078,348 A | 6/2000 | Klosterman et al. | |
| 6,081,830 A | 6/2000 | Schindler | |
| 6,091,883 A | 7/2000 | Artigalas et al. | |
| 6,098,065 A | 8/2000 | Skillen et al. | |
| 6,108,042 A | 8/2000 | Adams et al. | |
| 6,111,614 A | 8/2000 | Mugura et al. | |
| 6,112,186 A | 8/2000 | Bergh et al. | |
| 6,115,057 A | 9/2000 | Kwoh et al. | |
| 6,118,492 A | 9/2000 | Milnes et al. | |
| 6,119,098 A | 9/2000 | Guyot et al. | |
| 6,119,101 A | 9/2000 | Peckover | |
| 6,122,011 A | 9/2000 | Dias et al. | |
| 6,125,230 A | 9/2000 | Yaginuma | |
| 6,133,909 A | 10/2000 | Schein et al. | |
| 6,141,003 A | 10/2000 | Chor et al. | |
| 6,147,714 A | 11/2000 | Terasawa et al. | |
| 6,151,059 A * | 11/2000 | Schein et al. | 725/37 |
| 6,154,203 A | 11/2000 | Yuen et al. | |
| 6,157,413 A | 12/2000 | Hanafee et al. | |
| 6,160,545 A | 12/2000 | Eyer et al. | |
| 6,160,546 A | 12/2000 | Thompson et al. | |
| 6,160,570 A | 12/2000 | Sitnik | |
| 6,163,316 A | 12/2000 | Killian | |
| 6,172,677 B1 | 1/2001 | Stautner et al. | |
| 6,173,271 B1 | 1/2001 | Goodman et al. | |
| 6,177,931 B1 * | 1/2001 | Alexander et al. | 725/52 |
| 6,178,446 B1 | 1/2001 | Gerszberg et al. | |
| 6,181,335 B1 | 1/2001 | Hendricks et al. | |
| 6,186,287 B1 | 2/2001 | Heidenreich et al. | |
| 6,186,443 B1 | 2/2001 | Shaffer | |
| 6,191,780 B1 | 2/2001 | Martin et al. | |
| 6,201,536 B1 | 3/2001 | Hendricks et al. | |
| 6,202,212 B1 | 3/2001 | Sturgeon et al. | |
| 6,209,129 B1 | 3/2001 | Carr et al. | |
| 6,209,130 B1 | 3/2001 | Rector, Jr. et al. | |
| 6,239,794 B1 | 5/2001 | Yuen et al. | |
| 6,240,555 B1 | 5/2001 | Shoff et al. | |
| 6,253,203 B1 | 6/2001 | O'Flaherty et al. | |
| 6,256,071 B1 | 7/2001 | Hiroi | |
| 6,256,785 B1 | 7/2001 | Klappert et al. | |
| 6,257,268 B1 | 7/2001 | Hope et al. | |
| 6,262,721 B1 | 7/2001 | Tsukidate et al. | |
| 6,263,501 B1 | 7/2001 | Schein et al. | |
| 6,263,507 B1 | 7/2001 | Ahmad et al. | |
| 6,268,849 B1 | 7/2001 | Boyer et al. | |
| 6,275,268 B1 | 8/2001 | Ellis et al. | |
| 6,279,157 B1 | 8/2001 | Takasu | |
| 6,285,713 B1 | 9/2001 | Nakaya et al. | |
| 6,286,140 B1 | 9/2001 | Ivanyi | |
| 6,289,346 B1 | 9/2001 | Milewski et al. | |
| 6,298,482 B1 | 10/2001 | Seidman et al. | |
| 6,311,877 B1 | 11/2001 | Yang et al. | |
| 6,312,336 B1 | 11/2001 | Handelman et al. | |
| 6,320,588 B1 | 11/2001 | Palmer et al. | |
| 6,323,911 B1 | 11/2001 | Schein et al. | |
| 6,323,931 B1 | 11/2001 | Fujita et al. | |
| 6,331,877 B1 | 12/2001 | Bennington et al. | |
| 6,341,195 B1 | 1/2002 | Mankovitz et al. | |
| 6,342,926 B1 | 1/2002 | Hanafee et al. | |
| 6,357,042 B2 | 3/2002 | Srinivasan et al. | |
| 6,363,525 B1 | 3/2002 | Dougherty et al. | |
| 6,366,890 B1 | 4/2002 | Usrey | |
| 6,381,582 B1 | 4/2002 | Walker et al. | |
| 6,388,714 B1 | 5/2002 | Schein et al. | |
| 6,389,593 B1 | 5/2002 | Yamagishi | |
| 6,392,710 B1 | 5/2002 | Gonsalves et al. | |
| 6,396,546 B1 | 5/2002 | Alten et al. | |
| 6,400,407 B1 | 6/2002 | Zigmond et al. | |
| 6,405,371 B1 | 6/2002 | Oosterhout et al. | |
| 6,408,437 B1 | 6/2002 | Hendricks et al. | |
| 6,411,308 B1 | 6/2002 | Blonstein et al. | |
| 6,412,110 B1 | 6/2002 | Schein et al. | |
| 6,418,556 B1 | 7/2002 | Bennington et al. | |
| 6,421,067 B1 | 7/2002 | Kamen et al. | |
| 6,446,261 B1 | 9/2002 | Rosser | |
| 6,453,471 B1 | 9/2002 | Klosterman | |
| 6,463,585 B1 | 10/2002 | Hendricks et al. | |
| 6,469,753 B1 | 10/2002 | Klosterman et al. | |
| 6,470,497 B1 | 10/2002 | Ellis et al. | |
| 6,477,579 B1 | 11/2002 | Kunkel et al. | |
| 6,477,705 B1 | 11/2002 | Yuen et al. | |
| 6,486,920 B2 | 11/2002 | Arai et al. | |
| 6,493,876 B1 * | 12/2002 | DeFreese et al. | 725/100 |
| 6,498,895 B2 | 12/2002 | Young et al. | |

| | | | |
|---|---|---|---|
| 6,515,680 B1 | 2/2003 | Hendricks et al. | |
| 6,516,323 B1 | 2/2003 | Kamba | |
| 6,530,082 B1 | 3/2003 | Del Sesto et al. | |
| 6,539,548 B1 | 3/2003 | Hendricks et al. | |
| 6,545,722 B1 | 4/2003 | Schultheiss et al. | |
| 6,546,556 B1 | 4/2003 | Kataoka et al. | |
| 6,564,378 B1 | 5/2003 | Satterfield et al. | |
| 6,564,379 B1 | 5/2003 | Knudson et al. | |
| 6,574,424 B1 | 6/2003 | Dimitri et al. | |
| 6,588,013 B1 | 7/2003 | Lumley et al. | |
| 6,600,364 B1 | 7/2003 | Liang et al. | |
| 6,600,503 B2 | 7/2003 | Stautner et al. | |
| 6,606,128 B2 | 8/2003 | Hanafee et al. | |
| 6,622,306 B1 | 9/2003 | Kamada | |
| 6,631,523 B1 | 10/2003 | Matthews et al. | |
| 6,637,029 B1 | 10/2003 | Maissel et al. | |
| 6,651,251 B1 | 11/2003 | Shoff et al. | |
| 6,660,503 B2 | 12/2003 | Kierulff | |
| 6,661,468 B2 | 12/2003 | Alten et al. | |
| 6,665,869 B1 | 12/2003 | Ellis et al. | |
| 6,687,906 B1 | 2/2004 | Yuen et al. | |
| 6,698,020 B1 | 2/2004 | Zigmond et al. | |
| 6,704,931 B1 | 3/2004 | Schaffer et al. | |
| 6,732,369 B1 | 5/2004 | Schein | |
| 6,738,978 B1 | 5/2004 | Hendricks et al. | |
| 6,742,183 B1 | 5/2004 | Reynolds et al. | |
| 6,751,800 B1 | 6/2004 | Fukuda et al. | |
| 6,756,997 B1 | 6/2004 | Ward, III et al. | |
| 6,757,906 B1 | 6/2004 | Look et al. | |
| 6,792,618 B1 | 9/2004 | Bendinelli et al. | |
| 6,799,327 B1 | 9/2004 | Reynolds et al. | |
| 6,828,993 B1 | 12/2004 | Hendricks et al. | |
| 6,857,131 B1 | 2/2005 | Yagawa et al. | |
| 6,868,551 B1 | 3/2005 | Lawler et al. | |
| 6,938,208 B2 | 8/2005 | Reichardt | |
| 6,973,669 B2 | 12/2005 | Daniels | |
| 6,983,478 B1 | 1/2006 | Grauch et al. | |
| 7,003,792 B1 | 2/2006 | Yuen | |
| 7,028,326 B1 | 4/2006 | Westlake et al. | |
| 7,039,935 B2 | 5/2006 | Knudson et al. | |
| 7,047,550 B1 | 5/2006 | Yasukawa et al. | |
| 7,069,576 B1 | 6/2006 | Knudson et al. | |
| 7,117,518 B1 | 10/2006 | Takahashi et al. | |
| 7,185,355 B1 | 2/2007 | Ellis et al. | |
| 7,187,847 B2 | 3/2007 | Young et al. | |
| 7,266,833 B2 | 9/2007 | Ward, III et al. | |
| 7,287,267 B2 | 10/2007 | Knudson et al. | |
| 7,328,450 B2 | 2/2008 | Macrae et al. | |
| 7,480,929 B2 | 1/2009 | Klosterman et al. | |
| 7,487,529 B1 | 2/2009 | Orlick | |
| 7,493,641 B2 | 2/2009 | Klosterman et al. | |
| 7,503,055 B2 | 3/2009 | Reynolds et al. | |
| 7,634,786 B2 | 12/2009 | Knee et al. | |
| 7,665,109 B2 | 2/2010 | Matthews et al. | |
| 7,779,437 B2 | 8/2010 | Barton | |
| 2001/0001160 A1 | 5/2001 | Shoff et al. | |
| 2001/0029610 A1 | 10/2001 | Corvin et al. | |
| 2001/0042246 A1 | 11/2001 | Yuen et al. | |
| 2001/0047298 A1 | 11/2001 | Moore et al. | |
| 2001/0049820 A1 | 12/2001 | Barton | |
| 2001/0054181 A1 | 12/2001 | Corvin | |
| 2002/0042913 A1 | 4/2002 | Ellis et al. | |
| 2002/0042918 A1 | 4/2002 | Townsend et al. | |
| 2002/0049973 A1 | 4/2002 | Alten et al. | |
| 2002/0059602 A1 | 5/2002 | Macrae et al. | |
| 2002/0073424 A1 | 6/2002 | Ward, III et al. | |
| 2002/0083439 A1 | 6/2002 | Eldering | |
| 2002/0092017 A1 | 7/2002 | Klosterman et al. | |
| 2002/0120933 A1 | 8/2002 | Knudson et al. | |
| 2002/0124249 A1 | 9/2002 | Shintani et al. | |
| 2003/0005432 A1 | 1/2003 | Ellis et al. | |
| 2003/0110499 A1 | 6/2003 | Knudson et al. | |
| 2003/0163813 A1 | 8/2003 | Klosterman et al. | |
| 2003/0164858 A1 | 9/2003 | Klosterman et al. | |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0196203 A1 | 10/2003 | Ellis et al. | |
| 2003/0204847 A1 | 10/2003 | Ellis et al. | |
| 2003/0208756 A1 | 11/2003 | Macrae et al. | |
| 2003/0208758 A1 | 11/2003 | Schein et al. | |
| 2004/0003407 A1 | 1/2004 | Hanafee et al. | |
| 2004/0049787 A1 | 3/2004 | Maissel et al. | |
| 2004/0139465 A1 | 7/2004 | Matthews et al. | |
| 2004/0168189 A1 | 8/2004 | Reynolds et al. | |
| 2004/0194131 A1 | 9/2004 | Ellis et al. | |
| 2004/0194138 A1 | 9/2004 | Boylan, III et al. | |
| 2005/0155056 A1 | 7/2005 | Knee et al. | |
| 2005/0157217 A1 | 7/2005 | Hendricks | |
| 2005/0198668 A1 | 9/2005 | Yuen et al. | |
| 2005/0204382 A1 | 9/2005 | Ellis | |
| 2005/0216936 A1 | 9/2005 | Knudson | |
| 2005/0244138 A1 | 11/2005 | O'Connor et al. | |
| 2005/0278741 A1 | 12/2005 | Robarts et al. | |
| 2005/0283796 A1 | 12/2005 | Flickinger | |

FOREIGN PATENT DOCUMENTS

| | | | |
|---|---|---|---|
| AU | 733993 | | 2/1999 |
| CA | 1030505 | | 5/1978 |
| CA | 1187197 | | 5/1985 |
| CA | 1188811 | | 6/1985 |
| CA | 1196082 | | 10/1985 |
| CA | 1200911 | | 2/1986 |
| CA | 2151458 | | 6/1994 |
| CA | 2164608 | | 12/1994 |
| CA | 2285645 | | 7/1998 |
| CA | 2312326 | | 6/1999 |
| DE | 2918846 | | 11/1980 |
| DE | 3246225 | | 6/1984 |
| DE | 3337204 | | 4/1985 |
| DE | 3621263 | | 7/1988 |
| DE | 3909334 | | 9/1990 |
| DE | 4 440 419 | | 5/1996 |
| DE | 19531121 | A1 | 2/1997 |
| DE | 3909334 | | 2/1998 |
| DE | 19740079 | A1 | 3/1999 |
| DE | 19931046 | | 1/2001 |
| EP | 0 239 884 | | 10/1987 |
| EP | 0 396 062 | | 11/1990 |
| EP | 0 401 930 | A2 | 12/1990 |
| EP | 0 408 892 | | 1/1991 |
| EP | 0 420 123 | | 4/1991 |
| EP | 0 424 648 | A3 | 5/1991 |
| EP | 0 444 496 | A1 | 9/1991 |
| EP | 0 550 911 | | 12/1992 |
| EP | 0 532 322 | | 3/1993 |
| EP | 0 560 593 | A2 | 9/1993 |
| EP | 0 572 090 | B | 12/1993 |
| EP | 0 682 452 | A2 | 11/1995 |
| EP | 0 725 539 | | 8/1996 |
| EP | 0 752 767 | A2 | 1/1997 |
| EP | 0 753 964 | A1 | 1/1997 |
| EP | 0 762 751 | | 3/1997 |
| EP | 0 772 360 | A2 | 5/1997 |
| EP | 0 775 417 | B1 | 5/1997 |
| EP | 0 784 405 | | 7/1997 |
| EP | 0 805 594 | B1 | 11/1997 |
| EP | 0 822 718 | A1 | 2/1998 |
| EP | 0 880 856 | B1 | 2/1998 |
| EP | 0 784 405 | A3 | 3/1998 |
| EP | 0 827 340 | A2 | 3/1998 |
| EP | 0 834 798 | | 4/1998 |
| EP | 0 848 554 | A2 | 6/1998 |
| EP | 0 849 948 | A2 | 6/1998 |
| EP | 0 851 681 | A1 | 7/1998 |
| EP | 0 852 442 | A1 | 7/1998 |
| EP | 0 854 645 | A2 | 7/1998 |
| EP | 0 905 985 | A2 | 3/1999 |
| EP | 0 924 927 | A2 | 6/1999 |
| EP | 0 935 393 | A2 | 8/1999 |
| EP | 0 944 253 | A1 | 9/1999 |
| EP | 0 963 119 | A1 | 12/1999 |
| EP | 0 988 876 | | 3/2000 |
| EP | 1 095 504 | B1 | 5/2001 |
| EP | 0 822 718 | | 6/2002 |
| EP | 0 822 718 | B1 | 6/2002 |

(56) References Cited

FOREIGN PATENT DOCUMENTS

| | | |
|---|---|---|
| FR | 2662895 | 12/1991 |
| GB | 1 554 411 | 10/1979 |
| GB | 2034995 | 6/1980 |
| GB | 2126002 | 3/1984 |
| GB | 2185670 | 7/1987 |
| GB | 2256546 | 12/1992 |
| GB | 2 305 049 A | 3/1997 |
| GB | 2309134 A | 7/1997 |
| JP | 58-137334 | 8/1983 |
| JP | 58-196738 | 11/1983 |
| JP | 58 210776 A | 12/1983 |
| JP | 59-141878 | 8/1984 |
| JP | 60-061935 | 4/1985 |
| JP | 61-050470 | 3/1986 |
| JP | 61-074476 | 4/1986 |
| JP | 62-060370 | 3/1987 |
| JP | 62-060384 | 3/1987 |
| JP | 63 234679 A | 9/1988 |
| JP | 01-307944 | 12/1989 |
| JP | 02-048879 | 2/1990 |
| JP | 03063990 | 3/1991 |
| JP | 04-227380 | 8/1992 |
| JP | 05-183826 | 7/1993 |
| JP | 05-284437 | 10/1993 |
| JP | 06-021907 | 1/1994 |
| JP | 07-020254 | 1/1995 |
| JP | 07-23356 | 1/1995 |
| JP | 07-050259 | 2/1995 |
| JP | 07-076592 | 3/1995 |
| JP | 07-123326 | 5/1995 |
| JP | 07-147657 | 6/1995 |
| JP | 07-288759 | 10/1995 |
| JP | 07-321748 | 12/1995 |
| JP | 08-32528 | 2/1996 |
| JP | 08-32538 | 2/1996 |
| JP | 08-125497 | 5/1996 |
| JP | 08-251122 | 9/1996 |
| JP | 08-275077 | 10/1996 |
| JP | 08-331546 | 12/1996 |
| JP | 09-037151 | 2/1997 |
| JP | 09-037171 | 2/1997 |
| JP | 09-037172 | 2/1997 |
| JP | 09-102827 | 4/1997 |
| JP | 09-261609 | 10/1997 |
| JP | 10-042218 | 2/1998 |
| JP | 10-501936 | 2/1998 |
| JP | 10-512420 | 11/1998 |
| JP | 2838892 | 12/1998 |
| JP | 2001-213595 | 8/2001 |
| JP | 2002-279969 | 9/2002 |
| WO | WO 86-01962 | 3/1986 |
| WO | WO 87-03766 | 6/1987 |
| WO | WO 88-04507 | 6/1988 |
| WO | WO 89-02682 | 3/1989 |
| WO | WO 89-03085 | 4/1989 |
| WO | WO 89-12370 | 12/1989 |
| WO | WO 90-01243 | 2/1990 |
| WO | WO 90-15507 | 12/1990 |
| WO | WO91-00670 | 1/1991 |
| WO | WO 91-18476 | 11/1991 |
| WO | WO 92-04801 | 3/1992 |
| WO | WO 93-04473 | 3/1993 |
| WO | WO 93-05452 | 3/1993 |
| WO | WO 93-11638 | 6/1993 |
| WO | WO 93-11639 | 6/1993 |
| WO | WO 93-11640 | 6/1993 |
| WO | WO 93-23957 | 11/1993 |
| WO | WO 94-13107 | 6/1994 |
| WO | WO 94-14281 | 6/1994 |
| WO | WO 94-14282 | 6/1994 |
| WO | WO 94-14283 | 6/1994 |
| WO | WO 94-14284 | 6/1994 |
| WO | WO 94/14284 | 6/1994 |
| WO | WO 94-21085 | 9/1994 |
| WO | WO 94-23383 | 10/1994 |
| WO | WO 94-29811 | 12/1994 |
| WO | WO 95-01056 | 1/1995 |
| WO | WO 95-01058 | 1/1995 |
| WO | WO 95-01059 | 1/1995 |
| WO | WO 95-06389 | 3/1995 |
| WO | WO 95/07003 | 3/1995 |
| WO | WO 95-07003 | 3/1995 |
| WO | WO 95-10910 | 4/1995 |
| WO | WO 95-15649 | 6/1995 |
| WO | WO 95-15657 | 6/1995 |
| WO | WO 95-15658 | 6/1995 |
| WO | WO 95-19092 A1 | 7/1995 |
| WO | WO 95-28055 | 10/1995 |
| WO | WO 95/30302 | 11/1995 |
| WO | WO 95-30961 | 11/1995 |
| WO | WO 95-31069 | 11/1995 |
| WO | WO 95-32583 | 11/1995 |
| WO | WO 95/32585 | 11/1995 |
| WO | WO 95-32585 | 11/1995 |
| WO | WO 95/32587 | 11/1995 |
| WO | WO 96-07270 A | 3/1996 |
| WO | WO 96-08109 | 3/1996 |
| WO | WO 96-08113 | 3/1996 |
| WO | WO 96-09721 | 3/1996 |
| WO | WO 96/09721 | 3/1996 |
| WO | WO 96-13932 A1 | 5/1996 |
| WO | WO 96-13935 | 5/1996 |
| WO | WO 96-17467 | 6/1996 |
| WO | WO 96-17473 | 6/1996 |
| WO | WO 96-21990 | 7/1996 |
| WO | WO 96-26605 | 8/1996 |
| WO | WO 96-31980 | 10/1996 |
| WO | WO 96-34467 | 10/1996 |
| WO | WO 96-34486 | 10/1996 |
| WO | WO 96-34491 | 10/1996 |
| WO | WO 96/34491 | 10/1996 |
| WO | WO 96-38799 | 12/1996 |
| WO | WO 96-41471 | 12/1996 |
| WO | WO 96-41477 | 12/1996 |
| WO | WO 96-41478 | 12/1996 |
| WO | WO 97-04595 | 2/1997 |
| WO | WO 97/07656 | 3/1997 |
| WO | WO 97-07656 | 3/1997 |
| WO | WO 97/12486 | 4/1997 |
| WO | WO 97-13368 | 4/1997 |
| WO | WO 97/13368 | 4/1997 |
| WO | WO 97-17774 | 5/1997 |
| WO | WO 97/18675 | 5/1997 |
| WO | WO 97-18675 | 5/1997 |
| WO | WO 97-26612 | 7/1997 |
| WO | WO 97-31480 | 8/1997 |
| WO | WO 97/31480 | 8/1997 |
| WO | WO 97-41673 | 11/1997 |
| WO | WO 97-42763 | 11/1997 |
| WO | WO 97/42763 | 11/1997 |
| WO | WO 97/48228 | 12/1997 |
| WO | WO 97/48230 | 12/1997 |
| WO | WO 97-48230 | 12/1997 |
| WO | WO 97-49237 | 12/1997 |
| WO | WO 97/49237 | 12/1997 |
| WO | WO 97-49241 | 12/1997 |
| WO | WO 97-49242 | 12/1997 |
| WO | WO 97/49242 | 12/1997 |
| WO | WO 98-06219 | 2/1998 |
| WO | WO 98/06219 | 2/1998 |
| WO | WO 98-10589 | 3/1998 |
| WO | WO 98-16062 | 4/1998 |
| WO | WO 98-17064 | 4/1998 |
| WO | WO 98/17064 | 4/1998 |
| WO | WO 98-20675 | 5/1998 |
| WO | WO 98-26569 | 6/1998 |
| WO | WO 98-26584 | 6/1998 |
| WO | WO 98-27723 | 6/1998 |
| WO | WO 98/27723 | 6/1998 |
| WO | WO 98-28906 | 7/1998 |
| WO | WO 98-31148 | 7/1998 |
| WO | WO 98-37695 | 8/1998 |
| WO | WO 98/37695 | 8/1998 |
| WO | WO 98-41020 | 9/1998 |

(56) References Cited

FOREIGN PATENT DOCUMENTS

| | | |
|---|---|---|
| WO | WO 98-43183 | 10/1998 |
| WO | WO 98-47279 | 10/1998 |
| WO | WO 98-56172 | 12/1998 |
| WO | WO 98/56712 | 12/1998 |
| WO | WO 98-56712 | 12/1998 |
| WO | WO 99-04561 | 1/1999 |
| WO | WO 99/04561 | 1/1999 |
| WO | WO 99-07142 | 2/1999 |
| WO | WO 99-18722 | 4/1999 |
| WO | WO 99/29109 | 6/1999 |
| WO | WO 99-29109 | 6/1999 |
| WO | WO 99-30491 | 6/1999 |
| WO | WO 99-31480 | 6/1999 |
| WO | WO 99-45700 | 9/1999 |
| WO | WO 99-45702 | 9/1999 |
| WO | WO 99/45702 | 9/1999 |
| WO | WO 99-52285 | 10/1999 |
| WO | WO 99-56466 | 11/1999 |
| WO | WO 99-56473 | 11/1999 |
| WO | WO 99-60783 | 11/1999 |
| WO | WO 99-60789 | 11/1999 |
| WO | WO 00-04706 | 1/2000 |
| WO | WO 00-05889 | 2/2000 |
| WO | WO 00-11865 | 3/2000 |
| WO | WO 00-16548 | 3/2000 |
| WO | WO 00-27122 | 5/2000 |
| WO | WO 00-28734 | 5/2000 |
| WO | WO 00-33160 | 6/2000 |
| WO | WO 00-33224 | 6/2000 |
| WO | WO 00-33560 | 6/2000 |
| WO | WO 00-49801 | 8/2000 |
| WO | WO 00-079798 | 12/2000 |
| WO | WO 01-06784 | 1/2001 |
| WO | WO 01-15438 | 3/2001 |
| WO | WO 01-35662 | 5/2001 |
| WO | WO 01-89213 | 11/2001 |
| WO | WO 02-31731 | 4/2002 |

OTHER PUBLICATIONS

"Addressable Converters: A New Development at CableData," Via Cable, vol. 1, No. 12, Dec. 1981.
Advertisement for "TV Decisions," Cable Vision, Aug. 4, 1986.
Alexander, Michael "Visualizing cleared-off desktops," Computerworld, May 6, 1991, p. 20.
Antonoff, M., "Stay Tuned for Smart TV," Popular Science, Nov. 1990, pp. 62-65.
Baer, R.H, "Innovative Add-On TV Products," IEEE Transactions on Consumer Electronics, vol. CE-25, Nov. 1979, pp. 765-771.
"Bell Atlantic Buys Cable TV Company for $22bn," Financial Times (London), Oct. 14, 1993, p. 65.
Bensch, U., "VPV Videotext Programs Videorecorder," IEEE Paper, Jun. 1988, pp. 788-792.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Brochure, "A New Approach to Addressability," CableData, undated.
Brochure, "Westar and Videotoken Network Present the CableComputer," Revised Aug. 15, 1985 (Plantiff's 334).
Brochure, Time Inc., "Now, Through the Advances of the Computer Age, You Can Get the Information You Want, When You Want It. Instantly and Conveniently, on Your Home TV Screen, "Time Teletext, Time Video Information Services, Inc., undated (V 79167-79175).
Brochure, VTN "Videotoken Network, New Dimension Television," Dec. 1985 (Plaintiffs Exhibit 313).
Brugliera, Vito., "Digital On-Screen Display—A New Technology for the Consumer Interface," Symposium Record Cable TV Sessions of the 18th.

International Television Symposium & Technical Exhibition—Montreux, Switzerland, Jun. 10-15, 1993, pp. 571-586.
Cable Computer User's Guide, Rev. 1, Dec. 1985 (Plaintiffs Exhibit 289).
"Cable Television Equipment," Jerrold Communications Publication, dated 1992 and 1993, pp. 8-2.1 to 8-6 and 8-14.1 to 8-14.3.
Came, E.B., "The Wired Household," IEEE Spectrum, vol. 16 No. 10, Oct. 1979, pp. 61-66.
Chan, Patrick P., "Learning Considerations in User Interface Design: The Room Model," Publication of the Software Portability Laboratory, University of Waterloo, Ontario, Canada, Jul. 1984.
Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
"Computer Network: Current Status and Outlook on Leading Science and Technology," Bureau of Science & Technology (Japan), vol. 1, Dec. 1986.
Cox, J. et al, "Extended Services in a Digital Compression System,"Proceedings from Eleven Technical Sessions: 42nd Annual Convention and Exposition of the National Cable Television Association, Jun. 1993, pp. 185-191.
Creation/Modification of the Audio Signal Processor Setup for a PC Audio Editor, IBM Technical Disclosure Bulletin, vol. 30, No. 10, Mar. 1988, pp. 367-376.
"D2B-Home Bus Fur Audio and Video," Selektor, Apr. 1990, pp. 10, 12.
Damouny, N. G., "Teletext Decoders—Keeping Up With the Latest Advances," IEEE Transactions on Consumer Electronics, vol. CE-30, No. 3, Aug. 1984, pp. 429-435.
"Dial M for Movie", Funkschau Nov. 1994 Perspektiven, Video on Demand, pp. 78-79. (English language translation attached).
"Digital Video Broadcasting (DVB); DVB specification for data broadcasting," European Telecommunication Standards Institute, Draft EN 301 192 V1.2.1 (Jan. 1999).
DiRosa, S. "BIGSURK Netguide", Jul. 1995, vol. 3.1 (Sections 18,21, and 28—renumbered as pp. 1-27).
"Duck Tales," (1987)[TV Series 1987-1990], Internet Movie Database (IMDB) [Retrieved on Apr. 7, 2007].
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukunftige Informations-und Datenangebote beim dig italen Femsehen—EPG Und 'Lesezeichen'," RTM Rundfunktechnische Mitteilungen, Jun. 1997, vol. 41, pp. 67-72.
"Enhanced Content Specification," "ATVEF," from the internet at http://www.atvetcomilibraryispec.html, printed Aug. 22, 2001, the document bears a Copyright date of 1998, 1999, 2000.
European Telecommunication Standard, Electronic Programme Guide (EPG); Protocol for a TV Guide using electronic data transmission, by European Telecommunication Standards Institute, Valbonne, France, publication No. ETS 300 707 date of May 1997.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.
"Facsimile Transmission," NHK Research Monthly Report, Dec. 1987(Unknown author).
Hartwig, Rautenberg, Bollmann, "Broadcasting and Processing of Program Guides for Digital TV," SMPTE Journal, pp. 727-732, Oct. 1997.
Hedger, J., "Telesoftware: Home Computing Via Broadcast Teletext," IEEE Transactions on Consumer Electronics, vol. CE-25, No. 3, Jul. 1979, pp. 279-287.
Hiroshi Ishii et al, "Clearface: Translucent Multiuser Interface for TeamWorkStation," ECSCW, Sep. 1991, pp. 6-10.
Hiroshi Ishii et al, "Toward an Open Shared Workspace: Computer and Video Fusion Approach of Team Workstation," Communications of the ACM, Dec. 1991, vol. 34 No. 12, pp. 37-50.
Hirotada Ueda et al, "Impact: An Interactive Natural-Motion-Picture Dedicated Multi-Media Authoring System," Communications of the ACM, Mar. 1991, pp. 343-350.

(56) References Cited

OTHER PUBLICATIONS

Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.
Installation Guide, "Getting Started 1" Manual, and Remote Control "Quick Reference Guide".
Instructional Manual, "Sonic the Hedgehog," Sega of America, 1992.
"Interactive Computer Conference Server," IBM Technical Bulletin, vol. 34, No. 7A, Dec. 1991, pp. 375-377.
"Interface Device for Conventional TVs to Improve Functionality," IBM Technical Disclosure Bulletin, vol. 36, No. 7, Jul. 1993, pp. 53-54.
James Sorce, David Fay, Brian Raila and Robert Virzi, "Designing a Broadband Residential Entertainment Service: A Case Study," GTE Laboratories Incorporated, undated, pp. 141-148.
James, A., "Oracle—Broadcasting the Written Word," Wireless World, Jul. 1973, vol. 79 No. 1453, pp. 314-316.
Judice, C.N., "Move Over Cable, Here Comes Video Via Voice Lines," Network World, Sep. 1986, p. 26.
Karstad, K.,"Microprocessor Control for Color-TV Receivers," IEEE Transactions on Consumer Electronics, vol. CE-26, May 1980, pp. 149-155.
Kornhaas, W., "Von der Textprogrammierung uber TOP zum Archivsystem,"Radio Fernsehen Elektronik, vol. 40, No. 8, Aug. 30, 1991, pp. 465-468, XP 000240875 Veb Verlag Technik. Berlin, DE ISSN: 1436-1574.
Listing of computer code for operating system within the Cable Computer in 1985 (Plaintiffs Exhibit 298).
Listing of computer code for Video HTU Program (Plaintiff's Exhibit 299).
"Lists> What's on Tonite! TV Listings (fwd)," Internet article (On line), Jan. 28, 1995, XP 002378869 [Retrieved on Apr. 28, 2006].
Lowenstein, R.L. and Aller, H.E., "The Inevitable March of Videotex," Technology Review, vol. 88, Oct. 1985, p. 22.
M/A-COM, Inc., "Videocipher II Satellite Descrambler Owners Manual," dated Feb. 1986, pp. 1-24.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
Mannes, G., "Smart Screens: Development of Personal Navigation Systems For TV Viewers," Video Magazine, Dec. 1993.
Mar. 19, 1985 letter from G. Knapp of CableData to R. Hansen of Weststar Communications, Inc. (Plaintiff's Exhibit 325).
Markowitz, A. "Companies Jump on Interactive Bandwagon," Discount Store News, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
Merrell,R.G., "Tac Timer," 1986 NCTA Technical Papers, pp. 203-206.
"MSI Datacasting Systems," TV Communications Journal, Jan. 1973.
Neumann, Andreas, "WDR Online Aufbau and Perspektiven Automatisierter Online-Dienste im WDR," RTM Rundfunktechnische Mitteilungen, vol. 41, pp. 56-66, Jun. 1997.
No subject, "Tom Schauer (tschauer@moscow.com)Thu, Sep. 28, 1995 16:46:48-700," XP-002378870 [Retrieved from the Internet Apr. 28, 2006].
Office Action dated Sep. 8, 2006 re U.S. Appl. 10/453,388.
"Open TV fur interaktives Fernsehen," Trend and Technik, 9-95 RFE, p. 100. (English language translation attached).
"Open TV Launches OpenStreamer™ Technology for Broadcasters to Deliver First Ever Real-Time Digital Interactive Television," from the internet at http://www.opentv.corninewsiopenstreamer press final htm, printed on Jun. 28, 1999, the document bears a copyright date of 1999.
Pfister, Larry T., "Teletext: Its Time Has Come," Prepared for the IGC Videotext / Teletext Conference, Andover, Massachusetts, Dec. 14, 1982, pp. 1-11.

Prevue Guide Brochure, Spring 1994.
"Prevue Networks and OpenTV(R) Agree to Work Together on Deploying Interactive Program Guides Worldwide," from the internet at http://www.opentv.corninews/prevuefinal.htm, printed on Jun. 28, 1999.
"Probe XL Brochure, Auto Tote Systems Inc.," (Newark, Delaware) (undated) 57 pgs.
Prodigy Launches Interactive TV Listing, Apr. 22, 1994 public Broadcasting Report.
Rayers, D.J., "Telesoftware by Teletext," 1984 IEEE Conference Papers, vol. 240, p. 323.
"Rewind, reply and unwind with new high-tech TV devices," by Lawrence J. Magid, LA Times. This document was printed from the internet on Jun. 6, 1999 and bears a date of May 19, 1999.
Rogers, "Telcos vs. Cable TV : The Global View With Markets Converging And Regulatory Barriers Falling, Service Carriers Are Ready to Rumble," Data Communications, Sep. 21, 1995, vol. 24, No. 13, pp. 75-76, 78, 80, XP000526196.
Roizen, Joseph "Teletext in the USA," Society of Motion Picture and Television Engineers Journal, Jul. 1981, pp. 602-610.
Roseville City Council Presentation, Mar. 13, 1985 (Defendant's Exhibit 226).
Ross Peddicord, "New on TV: You Bet Your Horse," The Sun, Baltimore Maryland, Dec. 15, 1994, 1 pg.
Schlender, B.R., "Couch Potatoes! Now Its Smart TV," Fortune, Nov. 20, 1989, pp. 111-116.
Schmuckler, Eric "A marriage that's made in cyberspace (television networks pursue links with online information services)," May 16, 1994 Mediaweek, v. 4, No. 20, p. 22(3).
Sealfon, Peggy, "High Tech TV," Photographic,Dec. 1984.
"StarSight Interactive Television Program Guide III" Jim Leftwich and Steve Schein, Functional/ Interactional Architecture Specification Document, Orbit Interaction, Palo Alto, California, Published before Apr. 19, 1995.
"StarSight Interactive Television Program Guide IV" Jim Leftwich and Steve Schein, Functional/ Interactional Architecture Specification Document, Orbit Interaction, Palo Alto, California, Published before Apr. 19, 1995.
Sunada, K. et al, "Teletext Color Television Receiver Model C-29M950, C26M940," NEC Home Electronics , NEC Giho, 1987.
Sussman, A. "GTE Tunes in to Home TV Shopping," PC Week, Jun. 28, 1988, p. C15.
Tech Notes: Product Updates from M/A-COM Cable Home Group, "Videocipher Owners Manual Update," Issue No. 6, Feb. 1986.
Technical White Paper, "Open Operating Environment," (CD 1998 OpenTV Inc.), pp. 1-12.
Technological Examination & Basic Investigative Research Report on Image Databases, Japan Mechanical Engineering Organization Intl Society for the Advancement of Image Software, Japan, Mar. 1988.
Technology: Turn on, tune in and print out—An experimental interactive television service is set to alter our viewing habits, Financial Times (London), Oct. 14, 1993, p. 11.
The New Media and Broadcast Policy: An Investigation & Research Conference Report on Broadcasting Diversification, Radio Regulatory Bureau, Japan Ministry of Posts & Telecommunications, Mar. 1982.
Transcript of the Deposition of John Roop, Oct. 1996, pp. 186-187.
Trial testimony of Michael Axford, Prevue Interactive, Inc. and *United Video Satellite Group, Inc.* v. *Starsight Telecast, Inc.*, May 9, 1998, pp. 186-187, 295-315, and 352-357.
"TV Guide Online Set for Fall", Entertainment Marketing Letter, Aug. 1994.
"TV Listings Functional Spec.," Time Video Information Services, Inc., undated.
"Using StarSight 2," Instruction Manual, StarSight Telecast, Inc., Starsight CB 1500 Customer Letter, 1994.
UV-133 Cont. 6 Declaration Under 37 C.F.R. § 1.132 of Richard E. Glassberg, signed Oct. 20, 2006, filed Oct. 24, 2006.
Various publications of Insight Telecast, 1992 and 1993.
Veith, R.H., "Television's Teletext," Elsevier Science Publishing Co., Inc, 1983, pp. 13-20, 41-51.
Videocipher Stipulation, May 1996.

(56) References Cited

OTHER PUBLICATIONS

VideoGuide, "VideoGuide User's Manual," pp. 1-28 (p. 11 is the most relevant).
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Windows 98 Feature Combines TV, Terminal and the Internet, New York Times, Aug. 18, 1998.
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.
Yee Hsiang Chang et al., "An Open-Systems Approach to Video on Demand," IEEE Communications Magazine, May 1994, pp. 68-80.
Office Actions and Corresponding Replies in relation to U.S. Patent No. 7,398,541 issued Jul. 8, 2008.
Office Actions and Corresponding Replies in relation to U.S. Patent No. 7,487,529 issued Feb. 3, 2009.
Office Actions and Corresponding Replies in relation to U.S. Appl. No. 10/347,673 filed Jan. 17, 2003.
D2B-Home Bus Fur Audio and Video, Selektor, Apr. 1990, pp. 10, 12.

\* cited by examiner

PROGRAM GUIDE SYSTEM WITH FLIP AND BROWSE ADVERTISEMENTS

This application is a continuation of U.S. patent application Ser. No. 10/127,220, filed Apr. 19, 2002, which is a continuation of U.S. patent application Ser. No. 09/070,555, filed Apr. 30, 1998 (now U.S. Pat. No. 6,564,379), which are hereby incorporated by reference herein in their entireties.

BACKGROUND OF THE INVENTION

This invention relates to interactive television program guides, and more particularly, to techniques for presenting advertising to users of such television program guides.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid of program listings organized in a channel-ordered or a time-ordered list. Users may also search and sort program listings by theme (e.g., movies, sports, etc.) or by title (i.e, alphabetically). A user may obtain additional information for a program by placing a highlight region on a desired program listing and pressing an "info" key. The user may purchase a pay program from the program guide or may set a reminder for a future program by placing the highlight region on a program listing and pressing an "OK" key. Some systems allow the user to select a program for recording by placing the highlight region on a program listing and pressing a "record" key.

Program guides with a browse or flip display are capable of generating an overlay containing program listings information for a single channel. Browse displays contain information on programs available on channels other than the channel to which the user is currently tuned. The user may browse through program listings for other channels and other times using cursor keys, without changing the current channel. Flip displays contain information for the current channel. When the flip display is activated, using the up or down channel keys causes the both the current channel to change and the flip display to be updated accordingly.

Although flip and browse displays are useful, it would be desirable if more information were available to the user of such displays. For example, it would be desirable if advertisements were available in flip and browse displays to provide the users of such displays with additional information.

It is therefore an object of the present invention to provide an interactive television program guide system that provides advertising on flip and browse displays.

It is also an object of the invention to provide an interactive television program guide system with special effects for removing such flip and browse displays from the user's television screen.

SUMMARY OF THE INVENTION

These and other objects of the invention are accomplished in accordance with the principles of the present invention by providing a system having an interactive television program guide that provides video (including audio) for the current channel and a program listings display region containing a program listing for a single channel and an advertisement. The program listings display region may be either a browse display in which the channel or time for the program listing may be different than the current channel or time or a flip display in which the channel for the program listing and the current channel are the same.

A browse display may be provided in which a user may change the channel for the program listing by navigating a highlight to an advertisement adjacent to the program listing with a cursor key and by activating that cursor key again after the advertisement has been highlighted.

The advertisement may be selectable. When the user selects the advertisement, the program guide may take an appropriate action. If the advertisement is related to programming, selecting the advertisement may direct the program guide to perform a programming related task such as setting a reminder for a program, tuning to a program, recording a program, ordering a pay-per-view program, etc. If the advertisement is a conventional advertisement, selecting the advertisement may direct the program guide to assist in the ordering of a product or service, to process an inquiry for additional information, to display additional information, etc.

Multiple advertisements may be provided within the program listings display region. Advertisements may contain text, graphics, and video.

The program listings display region may be removed by the program guide using a special effect such as a wipe, a dissolve, a fade, etc.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
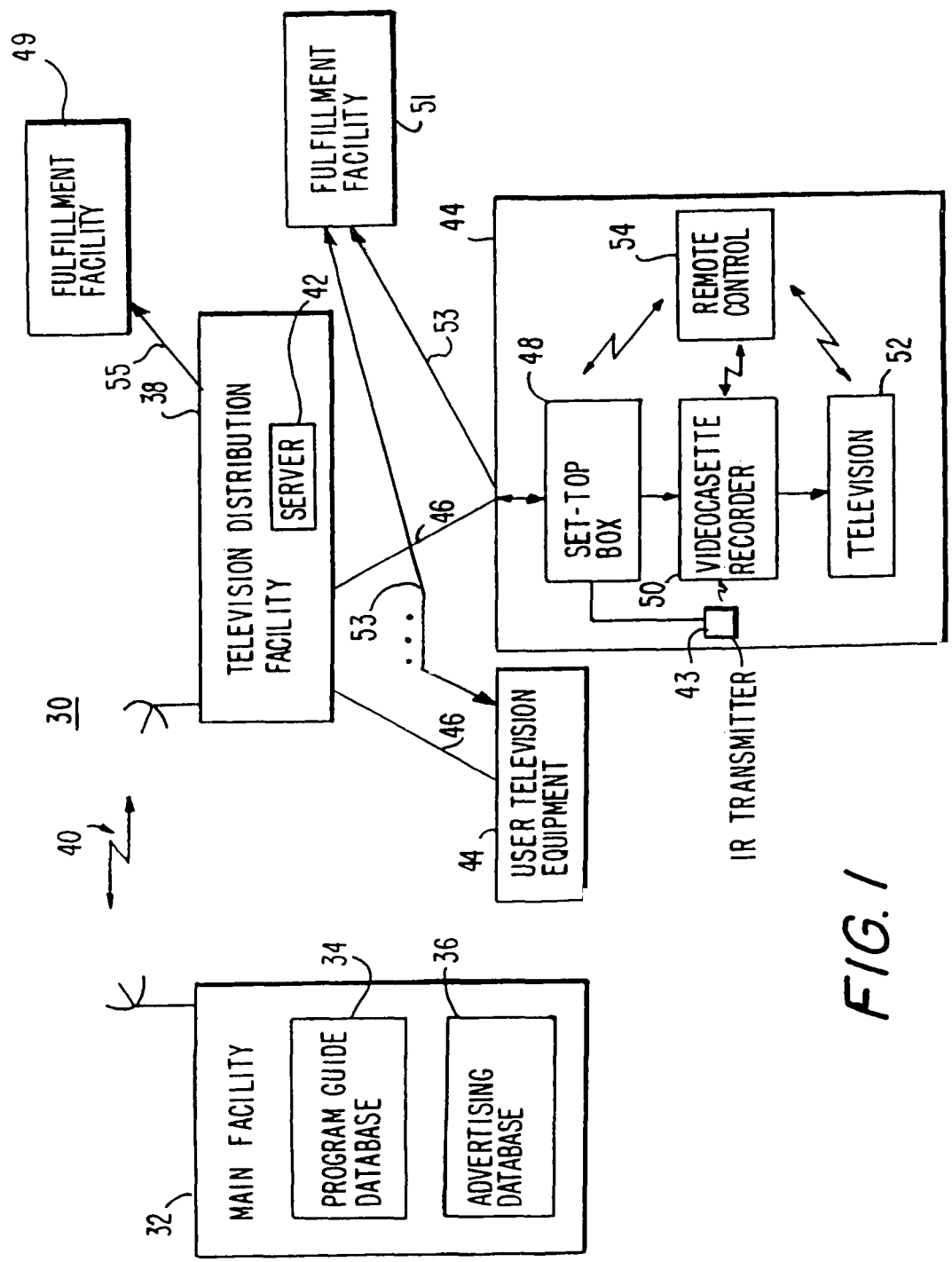
FIG. 1 is a diagram of a system in which an interactive television program guide is implemented in accordance with the present invention.

An illustrative program guide system 30 in accordance with the present invention is shown in FIG. 1. Main facility 32 contains a program guide database 34 for storing program guide information such as television program guide listings data, pay-per-view ordering information, television program promotional information, etc. Main facility 32 also contains an advertising database 36 for storing advertising information. Information from databases 34 and 36 may be transmitted to television distribution facility 38 via communications link 40. Link 40 may be a satellite link, a telephone network link, a cable or fiber optic link, a microwave link, a combination of such links, or any other suitable communications path. If it is desired to transmit video signals (e.g., for advertising and promotional videos) over link 40 in addition to data signals, a relatively high bandwidth link such as a satellite link is generally preferable to a relatively low bandwidth link such as a telephone line.

Television distribution facility 38 is a facility for distributing television signals to users, such as a cable system headed, a broadcast distribution facility, or a satellite television distribution facility.

The program guide information transmitted by main facility 32 to television distribution facility 38 includes television program listings data such as program times, channels, titles, descriptions, etc. Transmitted program information also includes pay program data such as pricing information for individual programs and subscription channels, time windows for ordering programs and channels, telephone numbers for placing orders that cannot be impulse ordered, etc. The advertising information transmitted by main facility 32 to television distribution facility 38 includes text, graphics, and video advertisements for various products and services. If desired, some of the program guide and advertising information may be provided using data sources at facilities other than main facility 32. For example, data related to pay program order processing (e.g., billing data and the like) may be generated by an order processing and billing system that is separate from main facility 32 and separate from television distribution facility 38. Similarly, advertising information may be generated by an advertising facility that is separate from main facility 32 and television distribution facility 38.

Regardless of its source, advertising information may be maintained on a server 42 within television distribution facility 38 if desired. Server 42 may be capable of handling text, graphics, and video.

Television distribution facility 38 distributes program guide and advertising information to the user television equipment 44 of multiple users via communications paths 46. User television equipment may be any suitable equipment for providing television to the user that contains sufficient processing capabilities to implement an interactive television program guide. Paths 46 may be cable links, fiber optic links, satellite links, broadcast links, or other suitable link or combination of such links. Any suitable communications scheme may be used to transmit data over paths 46, including in-band transmissions, out-of-band transmissions, digital transmissions, analog transmissions, cable transmissions, satellite transmissions, over-the-air transmissions, multichannel multipoint distribution services (MMDS) transmissions, etc.

If desired, program guide data may be distributed over an out-of-band channel on paths 46 or over an in-band path such as the vertical blanking interval (VBI). Advertising information may be distributed using any of a number of suitable techniques. For example, text and graphics advertisements may be distributed over an out-of-band channel using an out-of-band modulator. Video advertisements may also be distributed in this way, although large quantities of video information may be more efficiently distributed using one or more digital channels on path 46. Such digital channels may also be used for distributing text and graphics.

Each user has a receiver, which is typically a set-top box such as set-top box 48, but which may be other suitable television equipment such as an advanced television receiver into which circuitry similar to set-top-box circuitry has been integrated or a personal computer television (PC/TV). Program guide data is distributed to set-top boxes 48 periodically. Television distribution facility 38 may also poll set-top boxes 48 periodically for certain information (e.g., pay program account information or information regarding programs that have been purchased and viewed using locally-generated authorization techniques). Main facility 32 preferably contains a processor to handle information distribution tasks. Each set-top box 48 preferably contains a processor to handle tasks associated with implementing a program guide application on the set-top box 48. Television distribution facility 38 may contain a processor for handling tasks associated with the distribution of program guide and advertising information.

Each set-top box 48 is typically connected to an optional videocassette recorder 50 so that selected television programs may be recorded. Each videocassette recorder 50 is connected to a television 52. To record a program, set-top box 48 tunes to a particular channel and sends control signals to videocassette recorder 50 (e.g., using infrared transmitter 43) that direct videocassette recorder 50 to start and stop recording at the appropriate times.

During use of the interactive television program guide implemented on set-top box 48, television program listings may be displayed on television 52. Each set-top box 48, videocassette recorder 50, and television 52 may be controlled by one or more remote controls 54 or any other suitable user input interface such as a wireless keyboard, mouse, trackball, dedicated set of keys, etc.

Communications paths 46 preferably have sufficient bandwidth to allow television distribution facility 38 to distribute scheduled television programming, pay programming, advertising and other promotional videos, and other video information to set-top boxes 44 in addition to non-video program guide and advertising data. Multiple television and audio channels (analog, digital, or both analog and digital) may be provided to set-top boxes 48 via communications paths 46. If desired, program listings and advertising information may be distributed by one or more distribution facilities that are similar to but separate from television distribution facility 38 using communications paths that are separate from communications paths 46.

Certain functions such as pay program purchasing may require set-top boxes 48 to transmit data to television distribution facility 38 over communications paths 46. If desired, such data may be transmitted over telephone lines or other separate communications paths. If functions such as these are provided using facilities separate from television distribution facility 38, some of the communications involving set-top boxes 48 may be made directly with the separate facilities.

Users may interactively order additional information, products, or services. Such orders may be satisfied by fulfillment facilities 49 and 51. If desired, orders may be transmitted directly to fulfillment facilities such as fulfillment facility 51 via links 53, which may be telephone links, the Internet, or other suitable communications links. Orders may also be transmitted to television distribution facility 38 via links 46, where the billing system of the television distribution facility may be used. After the television distribution facility 38 has processed the user's order, television distribution facility 38 may transmit the order to fulfillment facility 49 via link 55.

A number of suitable techniques may be used to distribute videos related to advertising. For example, if each path 46 includes a number of traditional analog television channels, one or more of these channels may be used to support a number of digital channels. The bandwidth of each analog channel that is used to support digital channels may support ten or more of such digital channels. If desired, videos may be provided from server 42 in a continuously looped arrangement on these digital channels. Information provided to set-top box 48 may then be used to determine which digital channels to tune to when it is time to display a desired video. Alternatively, videos may be provided on demand. With this approach, set-top box 48 and server 42 may negotiate to determine a channel on which to provide the desired video. Videos that originate from main facility 32 or a separate facility are preferably distributed to user television equipment 44 using these or other suitable techniques.

Figure 2:
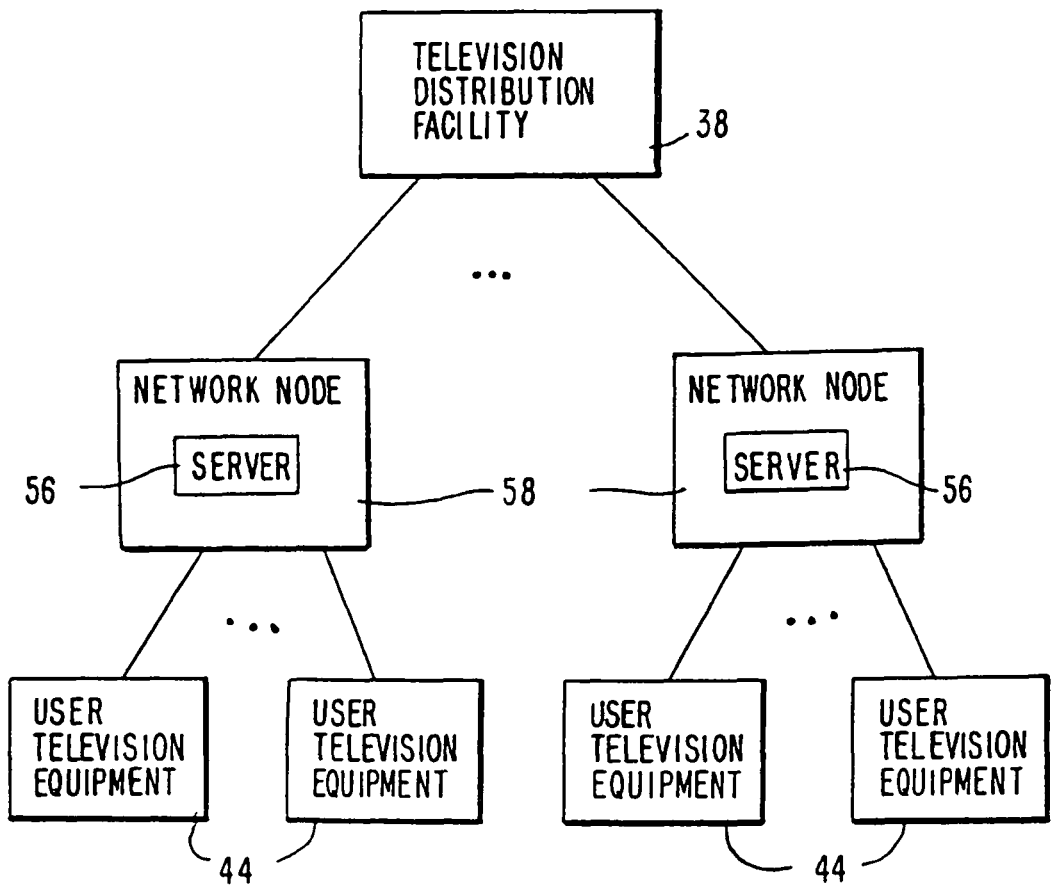
FIG. 2 is a diagram of a system similar to the system of FIG. 1 showing how servers may be located at network nodes in accordance with the present invention.

As shown in FIG. 2, the capabilities of server 42 may be provided using servers 56 located at network nodes 58. Servers such as servers 56 may be used instead of server 42 or may be used in conjunction with a server 42 located at the television distribution facility.

Graphics information for advertisements may be downloaded periodically (e.g., once per day) to set-top boxes 48 of FIG. 1 and stored locally. The graphics information may be accessed locally when needed by the program guide implemented on set-top box 48. Alternatively, graphics information may be provided in a continuously-looped arrangement on one or more digital channels on paths 46. With such a continuously-looped arrangement, a map indicating the location of the latest graphics information is preferably downloaded periodically to set-top boxes 48 (e.g., once per day). This allows the content on the digital channels to be updated. The program guides on set-top boxes 48 may use the map to locate desired graphics information on the digital channels. Another approach involves using a server such as server 42 or servers 56 (FIG. 2) to provide the graphics information after a set-top box 48 and that server have negotiated to set up a download operation. A bitmap or other suitable set of graphics information may then be downloaded from the server to the set-top box. If desired, the server may download instructions informing the set-top box where the desired graphics information can be located on a particular digital channel. The graphics information can be updated periodically if the server that is responsible for downloading the instructions for informing the set-top box of the location of the graphics information is also updated periodically.

Text information for advertisements may be provided to set-top boxes 48 using the same paths that are used for distributing program guide data. For example, advertising data from database 36 of FIG. 1 ay be provided to set-top boxes 48 using link 40, television distribution facility 38, and paths 46. The text information may be stored locally in set-top boxes 48 and updated periodically (e.g., once per day).

Text information, graphics information, and videos for advertisements may also be distributed using a combination of these techniques or any other suitable technique.

If desired, advertising related information (whether video, graphics, text, or a combination of video, graphics, and text) may be presented to the user based on the user's interests, as determined by the user's interactions with the program guide. This is described in Knudson et al. U.S. patent application Ser. No. 09/034,939, filed Mar. 4, 1998, which is hereby incorporated by reference herein in its entirety.

Figure 3:
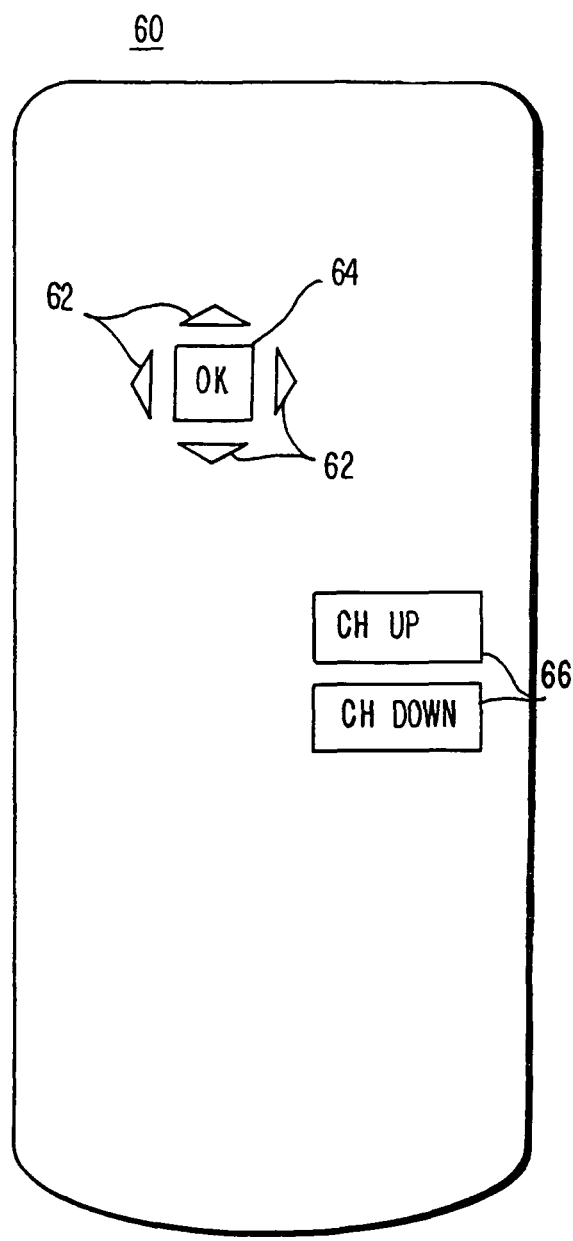
FIG. 3 is a simplified plan view of an illustrative remote control in accordance with the present invention.

A suitable remote control 60 that may be used to operate the program guide implemented on user television equipment 44 is shown in FIG. 3. Remote control 60 has cursor keys 62, a select or "OK" key 64, channel up and down keys 66. Remote control 60 also has various other keys for controlling the program guide and user television equipment that are not shown to avoid over-complicating the drawings.

Figure 4:
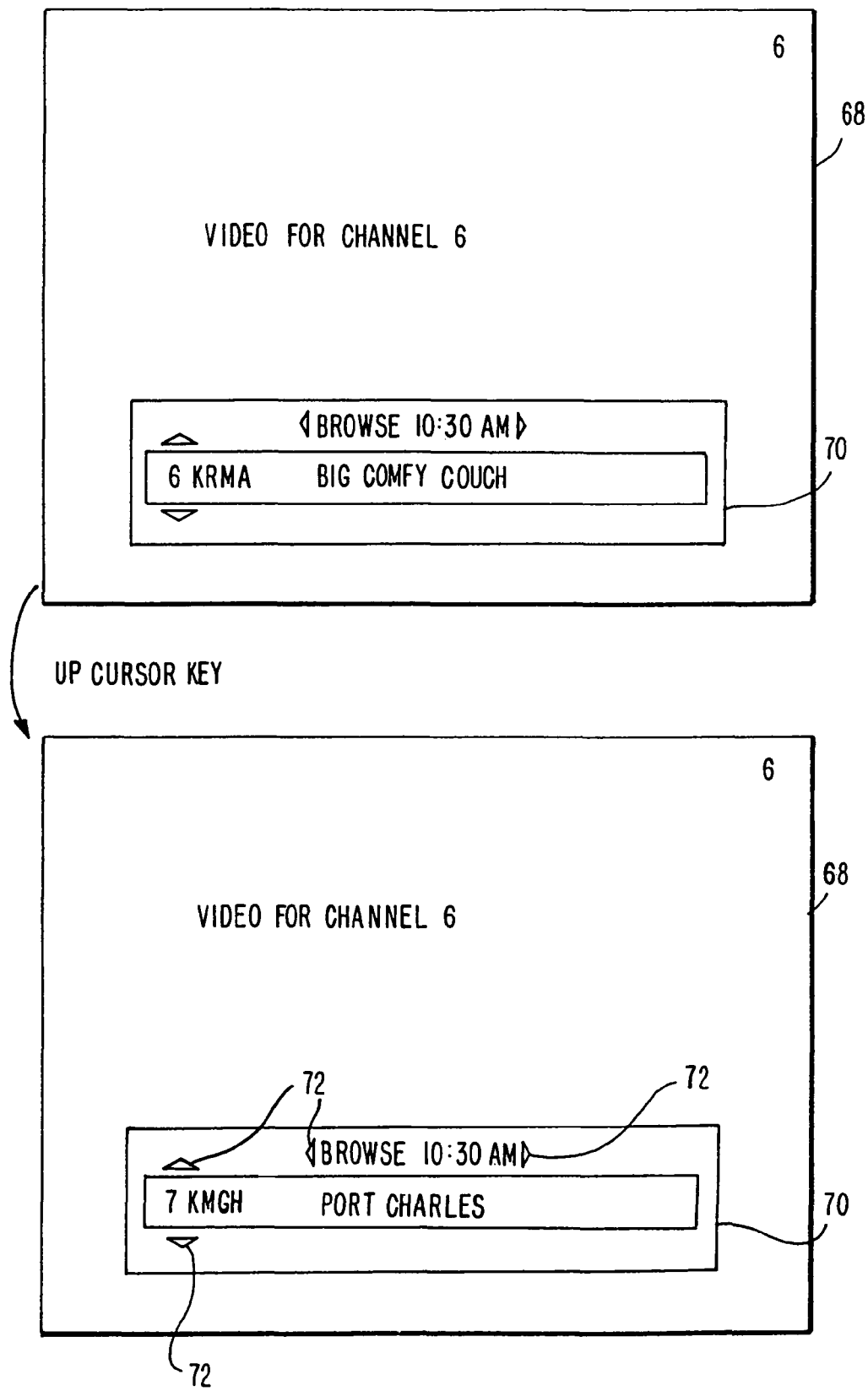
FIG. 4 is a diagram illustrating the operation of conventional browse displays.

A conventional program guide browse display arrangement is shown in FIG. 4. Video for the current channel to which the user's set-top box is tuned (i.e., the current channel that the user is viewing) is displayed on the user's television screen 68. When the user presses a remote control cursor key, browse display 70 is provided as an overlay on top of screen 68. Initially, browse display 70 contains program listings information for the current channel and time (e.g., channel 6 and 10:30 AM), as shown on the upper screen in FIG. 4. If the user presses a cursor key, the video for the current channel that is displayed on screen 68 is not changed, but the program listings information in browse display 70 is changed to the next available channel (e.g., channel 7), as shown on the lower screen in FIG. 4. As indicated by arrows 72, the user may use cursor keys to browse program listing for various other channels and times without disturbing the video for the current channel that is displayed on screen 68. If the user locates a currently airing program of interest, the user may press a remote control "OK" key that directs the program guide to tune to the channel for that program. Pressing the "OK" key when the program listing in the browse display is a future program directs the program guide to provide an opportunity to set a reminder for that program.

Figure 5:
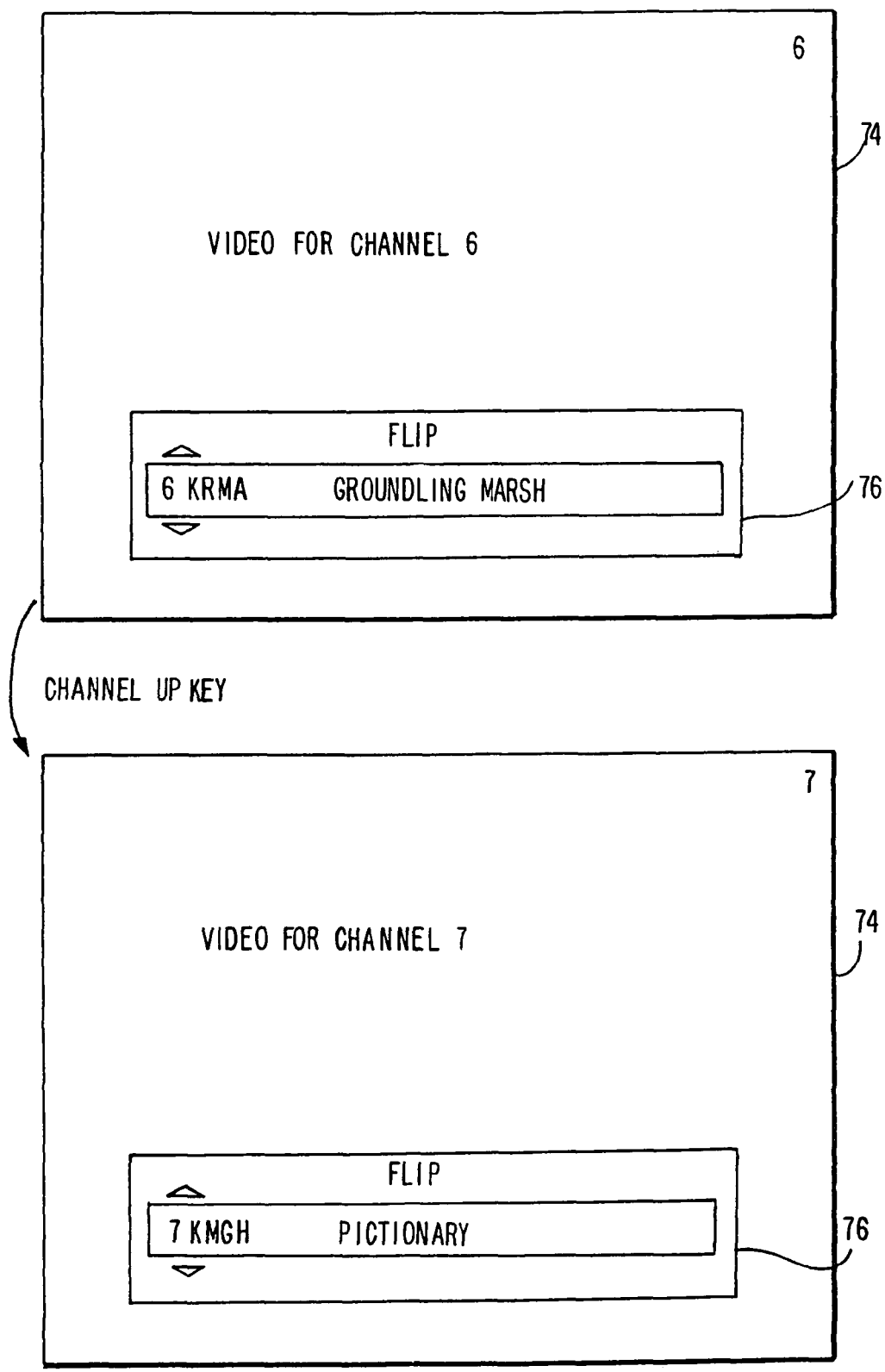
FIG. 5 is a diagram illustrating the operation of conventional flip displays.

A conventional flip display arrangement is shown in FIG. 5. Video for the current channel to which the user is tuned is displayed on screen 74. When the user presses a remote control channel up or down key, flip display 76 is provided as an overlay on top of screen 74. As shown on the upper screen in FIG. 5, flip display 76 contains program listings information for the current channel (e.g., channel 6). If the user presses a channel up or down key, the video for the current channel that is displayed on screen 74 is changed to the next available channel (e.g., channel 7) and the program listings information in flip display 76 is also changed to the next available channel (e.g., channel 7), as shown on the lower screen in FIG. 4.

As shown in FIGS. 4 and 5, in one mode (browse mode) the program guide provides a program listings overlay (the browse display) that is allowed to go out of synchronization with the current channel, whereas in another mode (flip mode) the program guide provides a program listings overlay (the flip display) in which the current channel and the program listings information in the overlay remain in synchronization. The user may operate the program guide in either browse mode or flip mode by using the appropriate remote control keys (e.g., cursor keys for browse mode and channel up and down keys for flip mode).

Figure 6:
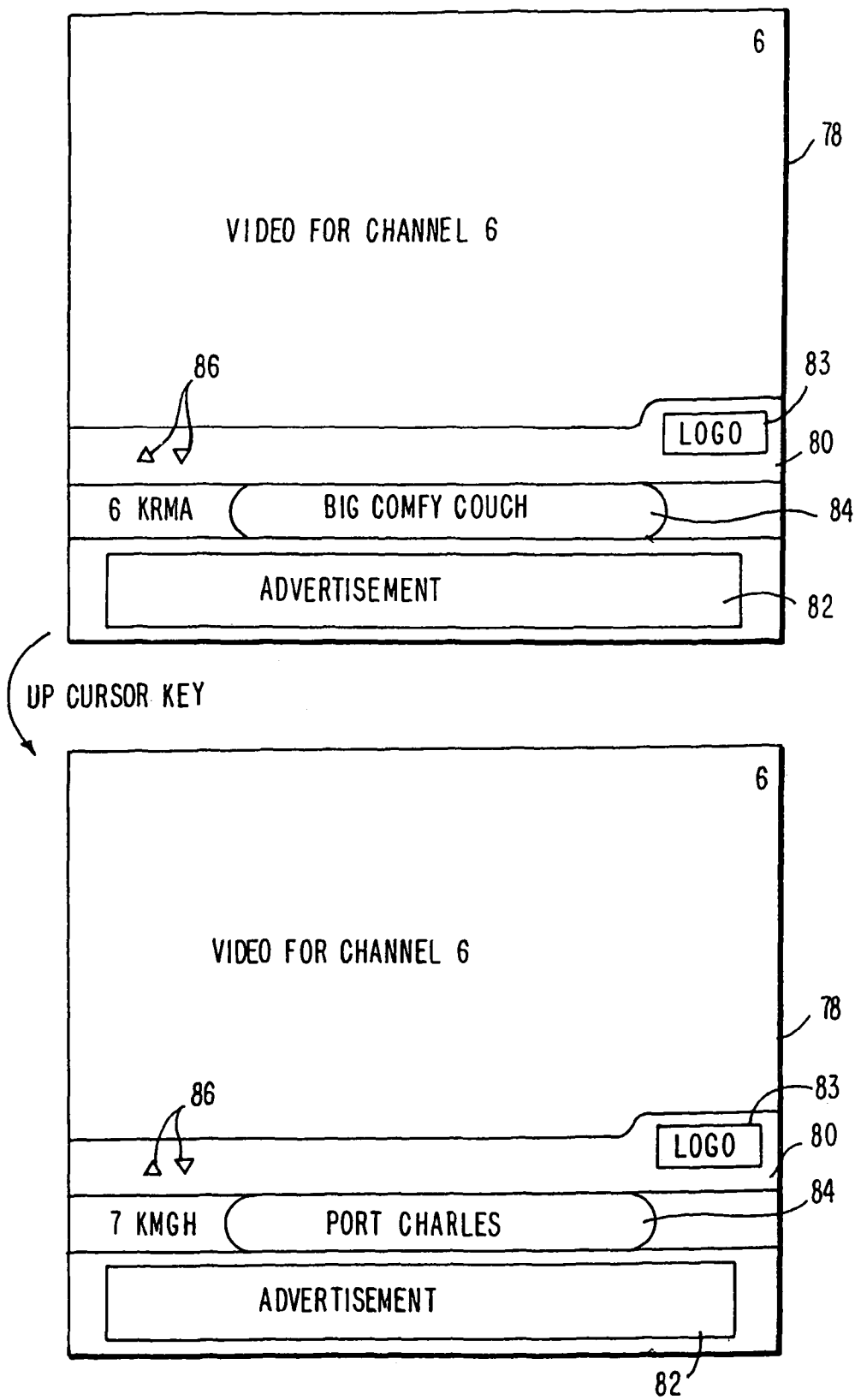
FIG. 6 is a diagram of an illustrative browse display containing an advertisement in accordance with the present invention.

In accordance with the present invention, the program guide provides browse and flip displays that contain advertisements. An illustrative browse display that may be provided by the program guide is shown in FIG. 6. Video for the current channel to which the user (i.e., set-top box 48 of FIG. 1) is tuned is displayed on screen 78. When the user presses a suitable key such as a remote control cursor key 62 (FIG. 3), the program guide implemented on user television equipment 44 of FIG. 1 provides browse display 80 as an overlay on top of screen 78 (which may be, e.g., the screen of television 52 of FIG. 1). Browse display 80 contains advertisement 82 and may contain a logo 83. Advertisement 82 may contain text, graphics (including animation), and video. Advertisement 82 may be a programming-related advertisement that is used to promote a television program or channel or may be a conventional advertisement used to promote non-programming products and services. If desired, advertisement 82 may be selectable by the user (e.g., using remote control keys). If advertisement 82 is selectable, the program guide may take various actions upon selection of advertisement 82 by the user. The content of advertisement 82 may be cycled (i.e., replaced periodically by another advertisement). A fade may be provided between advertisements as they are cycled.

When browse display 80 is initially invoked by the user by pressing a cursor key 62, browse display 80 contains program listing 84 for the current channel (e.g., channel 6) and time, as shown on the upper screen in FIG. 6. If the user presses a cursor key 62, the video for the current channel that is displayed on screen 78 is not changed, but the program listing 84 in browse display 80 is changed to the next available channel (e.g., channel 7), as shown on the lower screen in FIG. 6. As indicated by arrows 86, the user may use cursor keys to browse program listing for various other channels without disturbing the video for the current channel that is displayed on screen 78. If the user locates a program of interest with browse display 80, the user may press "OK" key 64 to direct the program guide to tune to the channel for that program.

Figure 7:
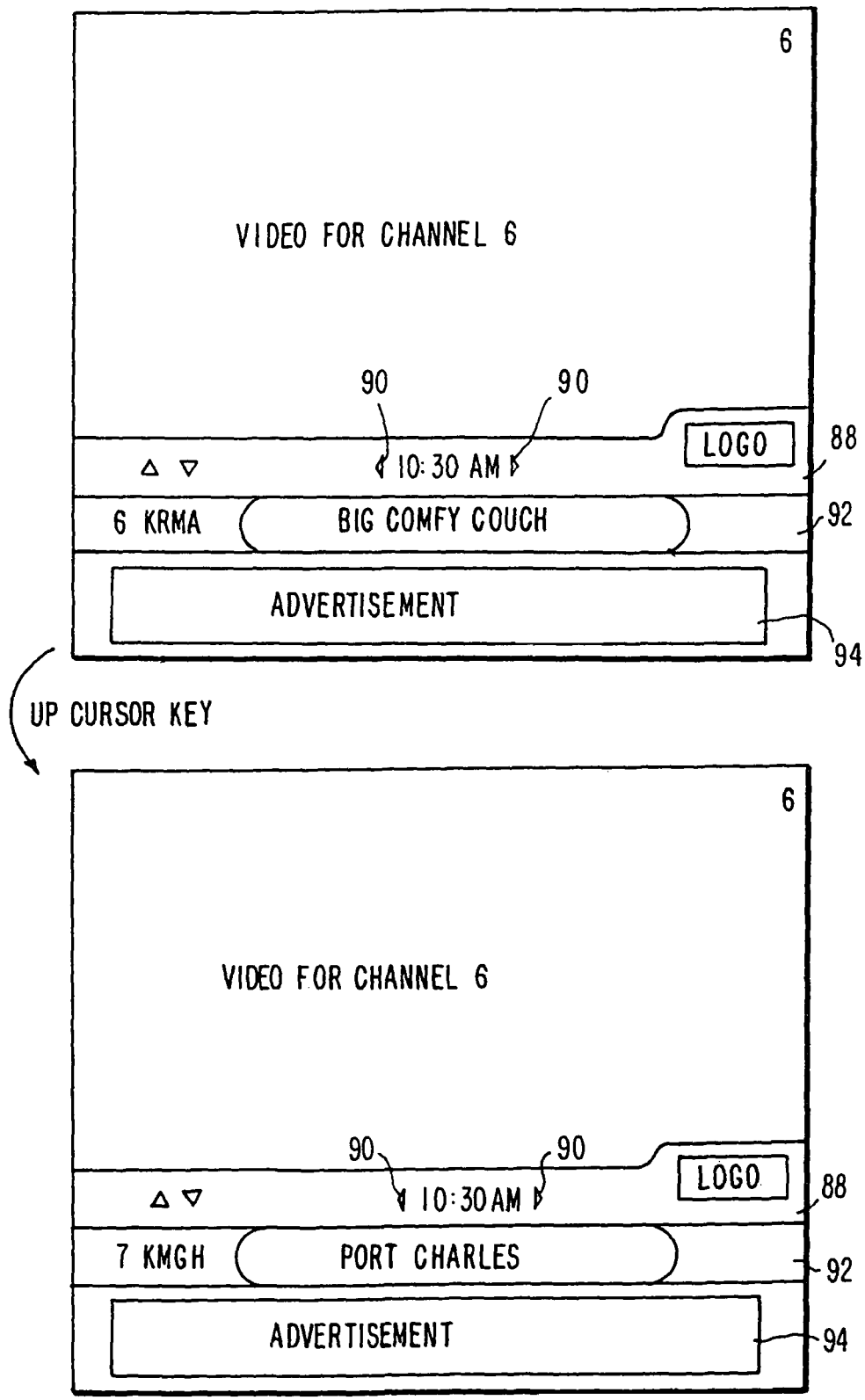
FIG. 7 is a diagram of another illustrative browse display containing an advertisement in accordance with the present invention.

As shown in FIG. 7, the program guide may provide a browse display 88 that allows the user to browse program listings for programs that are scheduled to be aired at times other than the current time. Arrow keys 90 indicate that the user may use left and right cursor keys 62 to direct the program guide to display program listings information 92 for different times. Pressing the "OK" key 64 when the program in browse display 88 is a future program may direct the program guide to provide an opportunity to set a reminder for the program or to schedule a recording of the program. As with the arrangement of FIG. 6, browse display 88 of FIG. 7 contains an advertisement 94.

Figure 8:
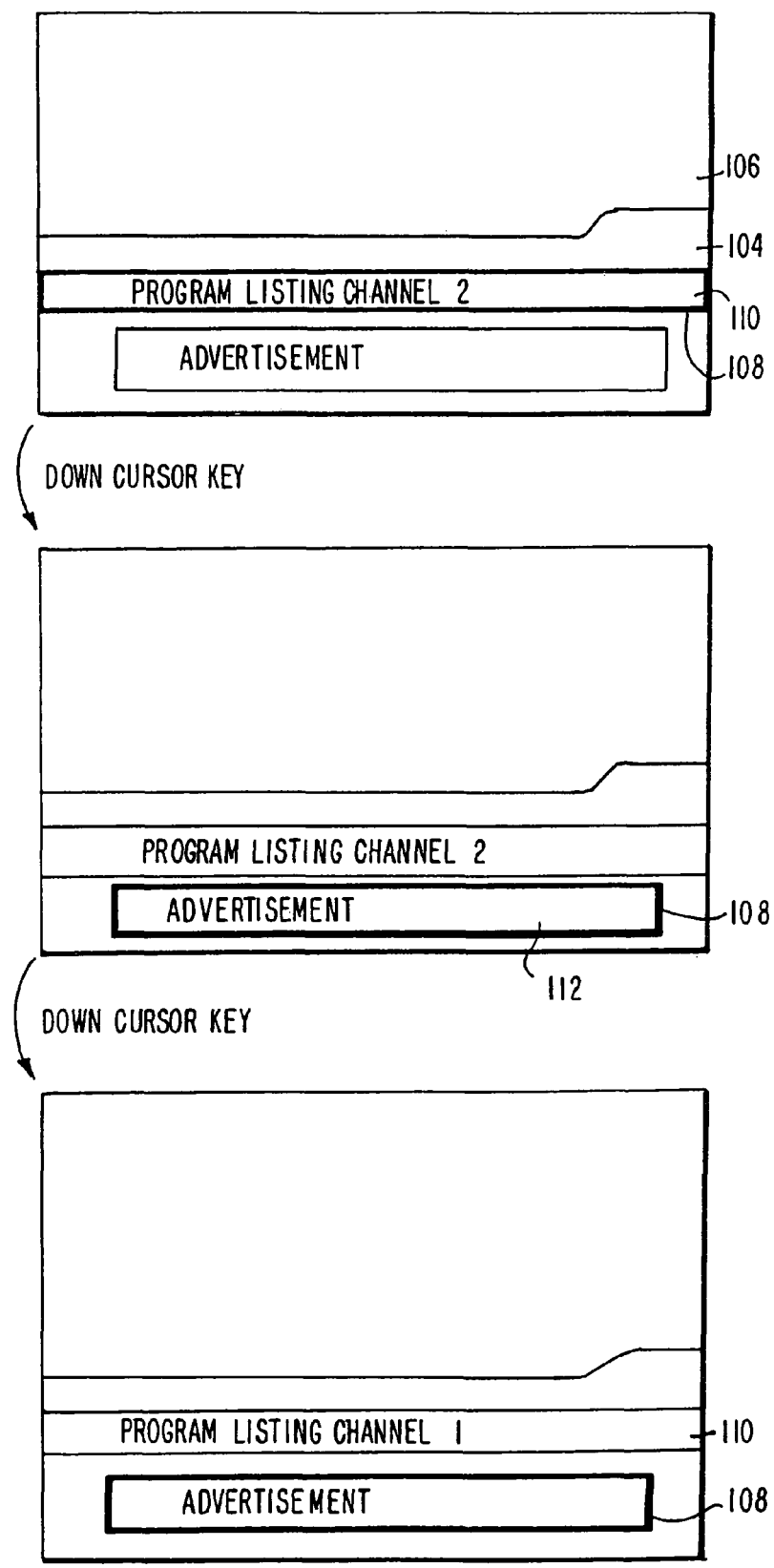
FIG. 8 is a diagram illustrating how a browse display containing an advertisement may be provided with a highlight that may be navigated to the advertisement in accordance with the present invention.

If advertisements such as advertisements 82 and 94 are selectable, the browse display may be provided with a movable highlight as shown in FIG. 8. When browse display 104 of FIG. 8 is initially overlaid on screen 106 (e.g., when the user first presses a cursor key 64), the program guide provides a highlight 108 positioned on program listing 110, as shown in the upper screen of FIG. 8. If the user presses an up cursor key 62, program listing 110 is changed to the program listing for the next available channel and highlight 108 remains positioned on the listing. If the user presses a down cursor key 62, program listing 110 is not changed. However, highlight 108 is positioned on advertisement 112, as shown in the center screen of FIG. 8. Further activation of the down cursor key 62 directs the program guide to replace the existing program listing 110 (e.g., the program listing for channel 2) with the program listing for the previous channel (e.g., the program listing for channel 1), as shown in the lower screen of FIG. 8. When the browse display is as shown in the lower screen of FIG. 8, further activation of the down cursor key 62 scrolls the program listings further, but does not move highlight 108. Activation of the up cursor key 62 when the browse display is as shown in the lower screen of FIG. 8 moves highlight 108 back to program listing 110, without changing the channel for the program listing 110.

Another way in which the program guide may allow the user to select advertisements such as advertisements 82 and 94 is to provide a special remote control button. Left and right cursor keys may be used to access advertisements (e.g., panel advertisements to the left or right of the program listing) if desired.

Figure 9:
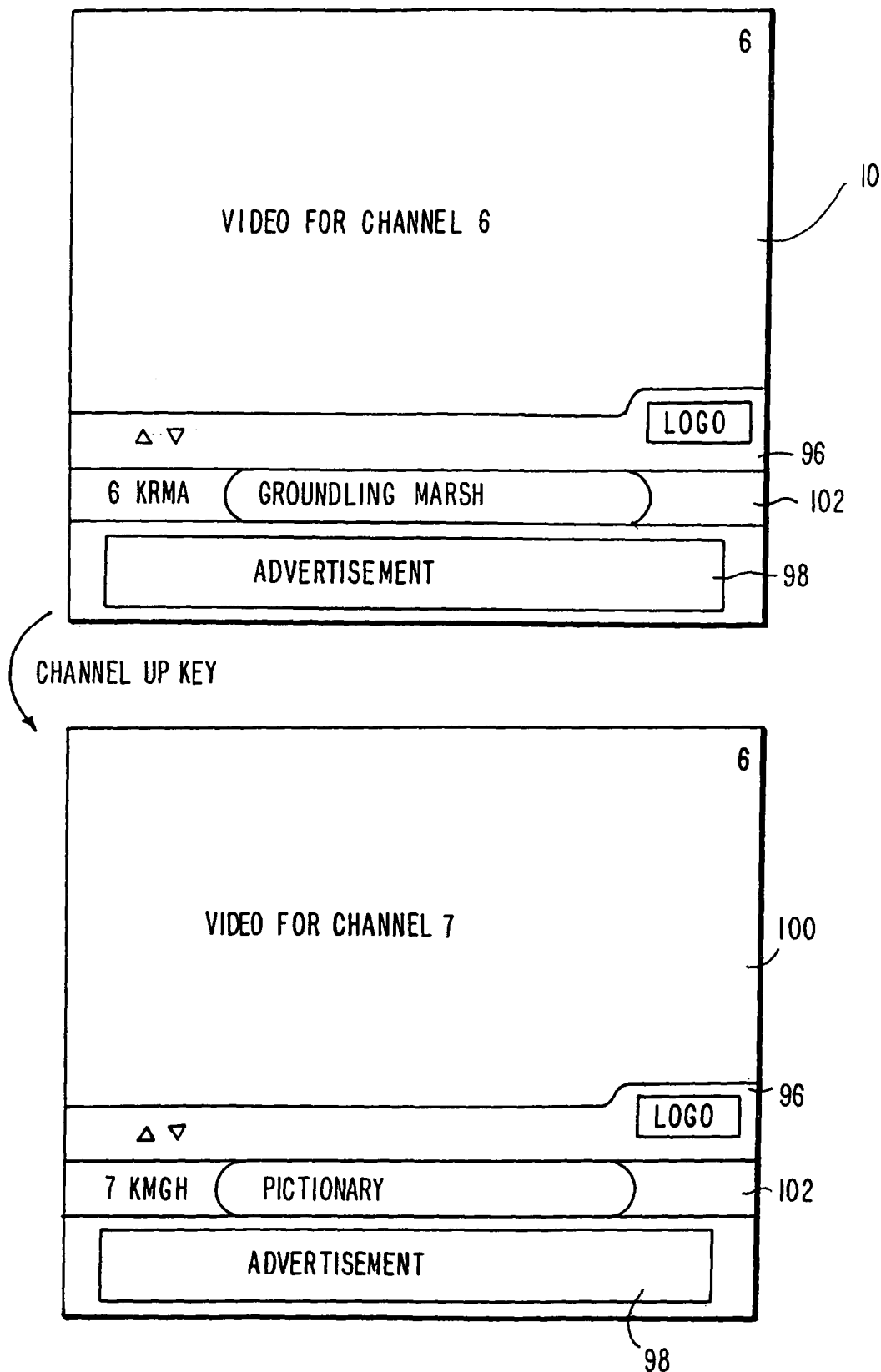
FIG. 9 is a diagram of an illustrative flip display containing an advertisement in accordance with the present invention.

A program guide flip display 96 containing an advertisement 98 is shown in FIG. 9. Video for the current channel to which the user (i.e., set-top box 48) is tuned is displayed on screen 100. When the user presses a suitable key such as a channel up or down key 66 (FIG. 3), flip display 96 is provided as an overlay on top of screen 100. As shown on the upper screen in FIG. 9, flip display 96 contains a program listing 102 for the current channel (e.g., channel 6). If the user presses a channel up or down key 66, the video for the current channel that is displayed on screen 100 is changed to the next available channel (e.g., channel 7) and the program listing 102 in flip display 96 is changed to the next available channel (e.g., channel 7), as shown on the lower screen in FIG. 9.

Another aspect of the invention involves removing program listings displays such as browse and flip displays from the screen. Browse displays may be removed after a period of inactivity (e.g., 5 minutes) that indicates that the user is no longer interested in browsing the program listings. The flip display (which may appear automatically whenever the user changes channels with the channel keys) may be removed after a shorter period of time (e.g., 5 seconds).

Figure 10:
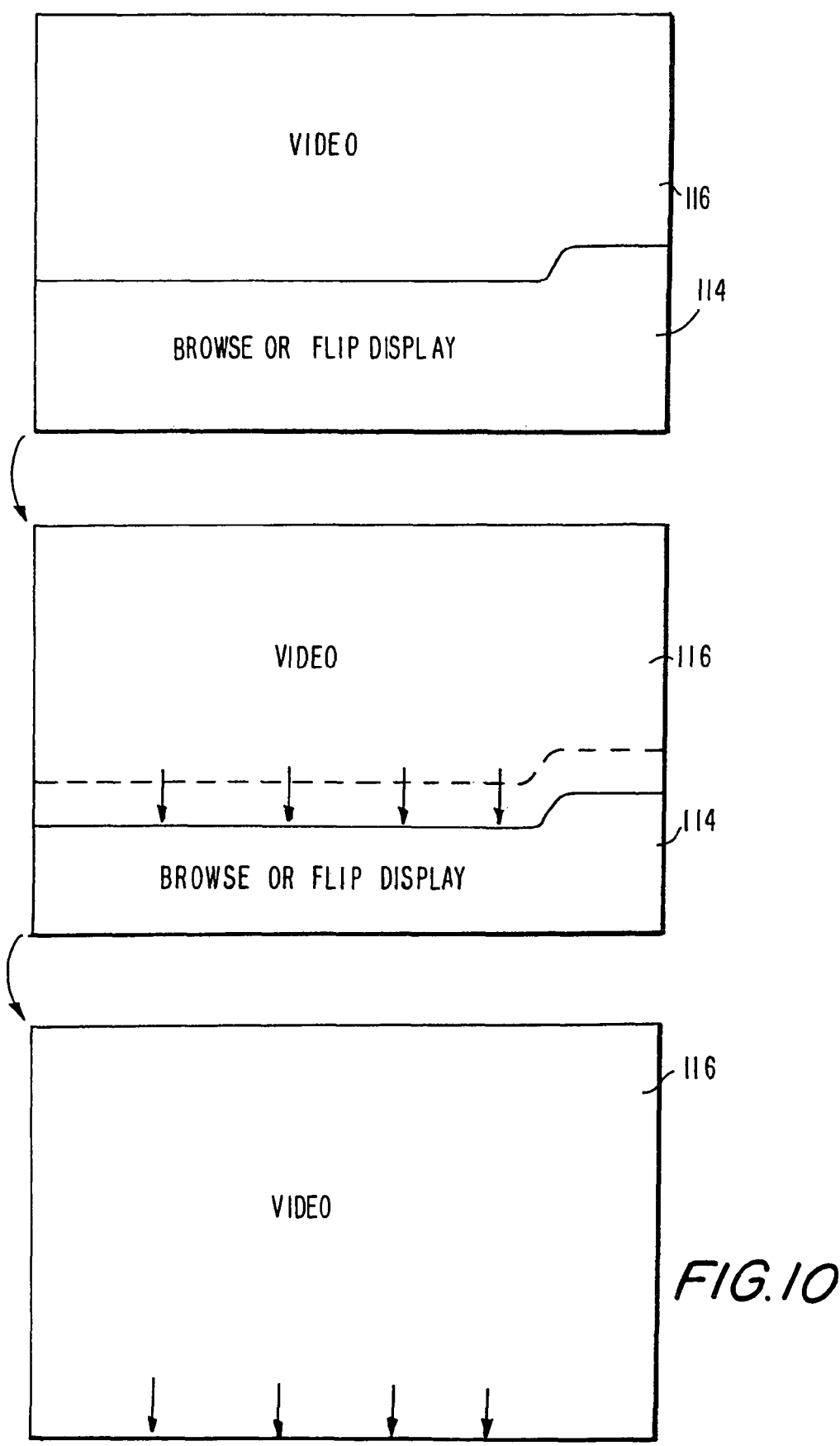
FIG. 10 is a diagram illustrating how a browse or flip display may be removed from the user's television screen using a special effect.

The program guide may remove program listings displays such as browse and flip displays from the screen using special effects. One such special effect (a vertical glide) is illustrated in FIG. 10. A full-size browse or flip display 114 is shown overlaid on the upper screen 116 of FIG. 10. After a suitable time period (e.g., after 5 minutes if display 114 is a browse display or after 5 seconds if display 114 is a flip display), the program guide smoothly glides display 114 off of screen 116, as shown in the center and lower screens 116 of FIG. 10.

The glide effect shown in FIG. 10 is only one illustrative special effect that may be used to remove program listings displays from the screen. Any suitable special effect may be used to remove such displays. Examples of suitable special effects include glides, dissolves, collapses, bounces, explosions, etc.

Figure 11:
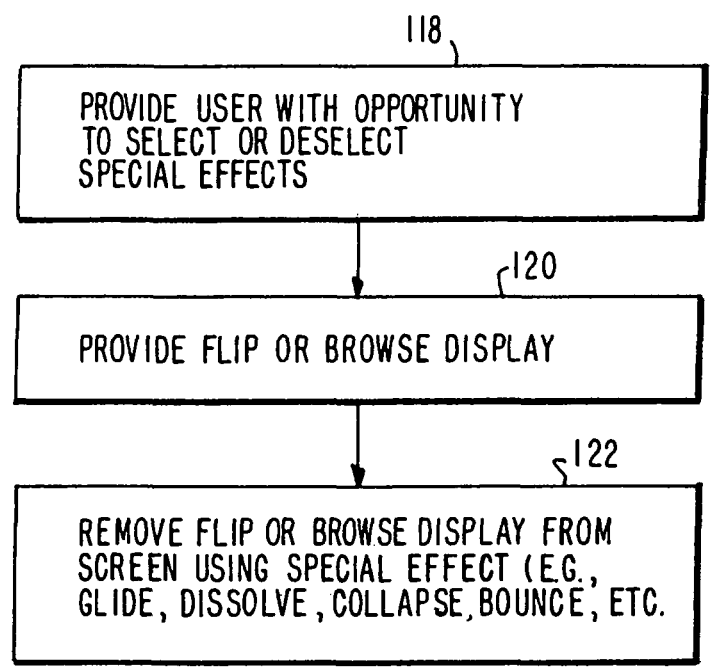
FIG. 11 is a flow chart illustrating steps involved in providing flip and browse displays and in removing such displays from the user's television screen using special effects.

Steps involved in using such special effects to remove a program listings display from the screen are shown in FIG. 11. At step 118, the program guide provides the user with an opportunity to select a desired special effect for the program guide to use in removing program listings. The user may make this selection from a suitable setup menu in the program guide. The user is also provided with an opportunity to deselect or otherwise cancel the use of these special effects. At step 120, the program guide provides a program listings display such as a flip or browse display on a screen (e.g., the user's television screen) in user television equipment 44. After a suitable time period (e.g., after 5 minutes if display 114 is a browse display or after 5 seconds if display 114 is a flip display), the program guide removes the program listings display (e.g., the flip or browse display) from the screen using a special effect at step 122. The program guide may use a default special effect at step 122 or may use a special effect selected by the user at step 118.

Figure 12:
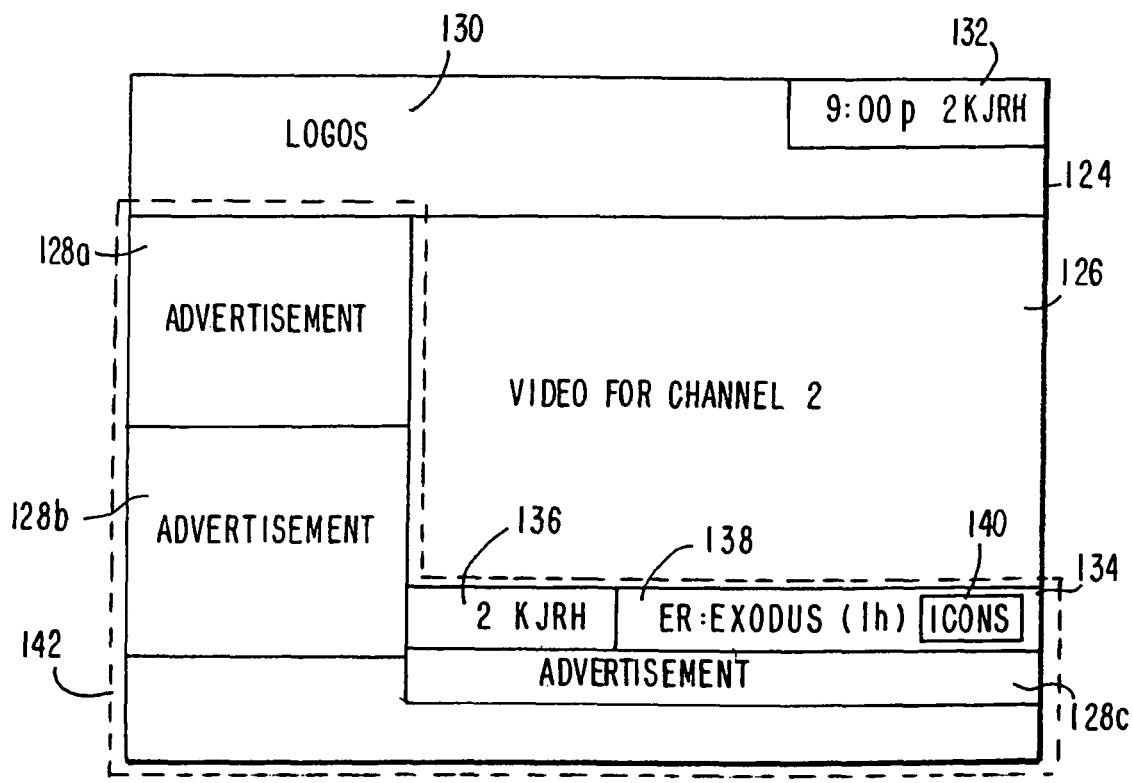
FIG. 12 is a diagram of another illustrative flip or browse display in accordance with the present invention.

Another browse and flip display arrangement containing advertising is shown in FIG. 12. Screen 124 contains a reduced-size video window 126 containing video for the channel to which the user (i.e., set-top box 48) is tuned.

Screen 124 also contains advertisements 128a, 128b, and 128c. Logos 130 and a region 132 containing the current time and current channel may also be contained in screen 124. Program listing 134 may be provided in screen 124 adjacent to reduced-size video window 126. Program listing 134 may contain channel information 136, title information 138, and icons 140 (e.g., for showing ratings information, close-captioning status, etc.).

Like the browse and flip program listings display regions shown in FIGS. 6-9, program listings display region 142 contains a single program listing (for the program "ER" in the example of FIG. 12) and may contain one or more advertisements if desired. However, because video window 126 is reduced in size (i.e., it occupies less than a full screen), it is not necessary to overlay program listings display region 142 on top of the current channel.

Program listings display region 142 may operate in either browse mode or flip mode. The user may invoke the browse mode by activating a cursor key or other suitable key. Further use of the cursor key in browse mode directs the program guide to change the program listing 134 to a new channel without changing the channel for video window 126. If desired, left and right cursor keys may be used to browse program listings for different times. Activating "OK" key 64 directs the program guide to tune the channel for video window 124 to the channel of the current program listing. The user may invoke the flip mode by activating a channel up or down key or other suitable key. Further use of the channel up or down key in the flip mode directs the program guide to change the channel for both video window 126 and program listing 134 simultaneously. If desired, advertisement 128c may be omitted to provide more space for listing 134 and video window 126. The user may navigate to panel advertisements such as advertisements 128a and 128b using special (e.g., dedicated or numeric) remote control buttons or by using the left and right cursor keys (in which case the left and right cursor keys are not used for browsing program listings at different times).

Figure 13:
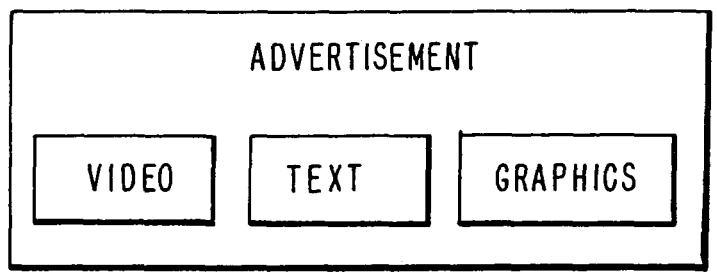
FIG. 13 is a diagram of an illustrative advertisement in accordance with the present invention.

As shown in FIG. 13, advertisements such as the advertisements in the program listings display regions shown in FIGS. 6-9 and 12 may contain video text and graphics. More than one advertisement may be displayed in each program listings display if desired.

Advertisements such as those shown in FIGS. 6-9 and 12 may be selectable. The user may navigate to a selectable ad using any suitable arrangement, such as using special remote control navigation keys. Once the user has navigated to a given advertisement, the user may select that advertisement using an "OK" key. Any other suitable technique for selecting an advertisement may be used if desired.

Figure 14:
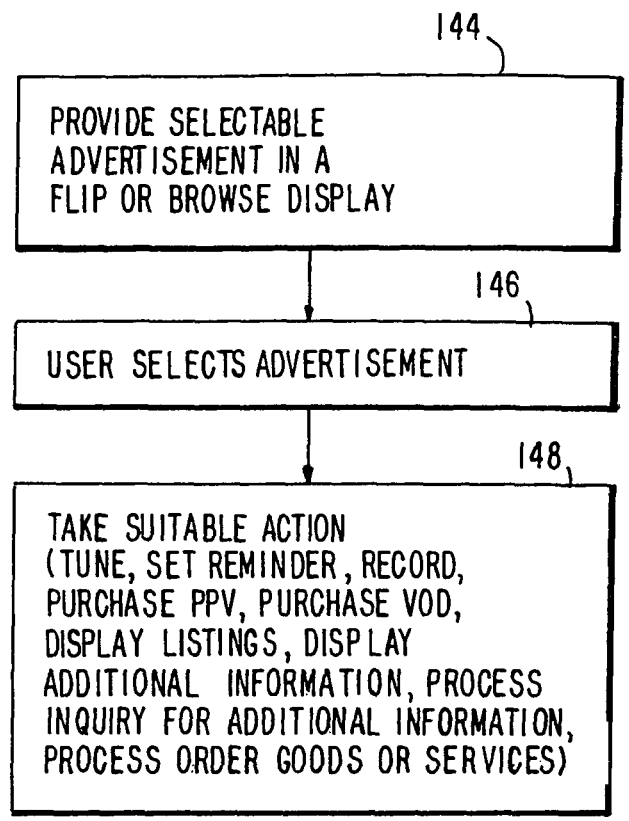
FIG. 14 is a flow chart of steps involved in providing a selectable advertisement and taking suitable actions in the program guide in response to selection of the advertisement by a user in accordance with the present invention.

Steps involved in using selectable advertisements are shown in FIG. 14. At step 144, the program guide provides a selectable advertisement in a flip or browse display. At step 146, the user selects the advertisement. At step 148, the program guide takes a suitable action. If the advertisement is for a television program that is currently being aired, the program guide may provide the user with an opportunity to tune to that program. If the advertisement is for a future television program, the program guide may provide the user with an opportunity to set a reminder for that program. If desired, the program guide may provide the user with an opportunity to have the program recorded. Pay-per-view and video-on-demand (VOD) programs may be ordered. When an advertisement is for a particular television channel, selecting the advertisement may direct the program guide to provide the user with a list of programs for that channel. Additional information (e.g., on a program, product, or service) may be requested by selecting certain advertisements. Brochure and literature requests and other such inquiries for additional information may be handled by the program guide at step 148 if the user selects an advertisement involving such an inquiry. Selectable advertisements may also be provided that promote goods and services. If the user selects such an advertisement at step 146, the program guide system may process an order for the goods or services being advertised at step 148.

The foregoing is merely illustrative of the principles of this invention and various modifications can be made by those skilled in the art without departing from the scope and spirit of the invention.

What is claimed is:

1. A method for using an interactive program guide to generate program listings information and selectable advertisement for display on a display on which video for a given television channel is displayed, the method comprising:
   generating for display over the video for the given television channel an overlay comprising a program listings region and another region, wherein the program listings information is generated for display only in the program listings region, the selectable advertisement is generated for display only in the other region, and the overlay partially obscures the video for the given television channel such that a portion of the video for the given television channel is viewable simultaneously with the program listings region and the other region;
   receiving a command to view a new program listing in the program listings region, wherein the command is invoked by a directional key on a remote control;
   navigating a highlight region, in response to the command, wherein the command is invoked by the directional key on the remote control, from the program listings information in the program listings region to the selectable advertisement in the other region when the selectable advertisement is not currently highlighted;
   generating for display the new program listing in the program listings region, in response to the command, wherein the command is invoked by the directional key on the remote control, when the selectable advertisement in the other region is currently highlighted; and
   receiving a user selection when the selectable advertisement in the other region is highlighted; and
   in response to the user selection, generating for display additional information related to the selectable advertisement.

2. The method of claim 1 wherein the additional information is at least one of: a product, a service, a brochure, and a literature.

3. The method of claim 1 wherein the other region comprises text, graphics, or video.

4. The method of claim 1 further comprising:
   cycling content displayed in the other region; and
   providing a fade between the displayed content in the other region as it is cycled.

5. The method of claim 1 wherein the program listings information is associated with a different television channel than the given television channel.

6. The method of claim 1 wherein the other region comprises at least one advertisement that promotes a television program, the method further comprising recording the television program when the at least one advertisement is selected.

7. The method of claim 1 wherein the other region comprises at least one advertisement that promotes a television program, the method further comprising setting a reminder for the television program when the at least one advertisement is selected.

8. The method of claim 1 further comprising:
allowing the user to navigate the highlight region between the program listings information in the program listings region and the advertisement in the other region by issuing a user control command.

9. The method of claim 1, wherein at least a substantial portion of the video for the given television channel is viewable simultaneously with the program listings information and the advertisement.

10. A system for using an interactive program guide to generate program listings information and a selectable advertisement for display on a display on which video for a given television channel is displayed, the system comprising:
a processor configured to:
generate for display over the video for the given television channel an overlay comprising a program listings region and another region, wherein the program listings information is generated for display only in the program listings region, the selectable advertisement is generated for display only in the other region, and the overlay partially obscures the video for the given television channel such that a portion of the video for the given television channel is viewable simultaneously with the program listings region and the other region;
receive a command to view a new program listing in the program listings region, wherein the command is invoked by a directional key on a remote control;
navigate a highlight region, in response to the command, wherein the command is invoked by the directional key on the remote control, from the program listings information in the program listings region to the selectable advertisement in the other region when the selectable advertisement is not currently highlighted;
generate for display the new program listing in the program listings region, in response to the command, wherein the command is invoked by the directional key on the remote control, when the selectable advertisement in the other region is currently highlighted; and
receive a user selection when the selectable advertisement in the other region is highlighted; and
in response to the user selection, generate for display additional information related to the selectable advertisement.

11. The system of claim 10 wherein the additional information is at least one of: a product, a service, a brochure, and a literature.

12. The system of claim 10 wherein the other region comprises text, graphics, or video.

13. The system of claim 10 wherein the processor is further configured to:
cycle content displayed in the other region; and
provide a fade between the displayed content in the other region as it is cycled.

14. The system of claim 10 wherein the program listings information is associated with a different television channel than the given television channel.

15. The system of claim 10 wherein the other region comprises at least one advertisement that promotes a television program and wherein the processor is further configured to record the television program when the at least one advertisement is selected.

16. The system of claim 10 wherein the other region comprises at least one advertisement that promotes a television program and wherein the processor is further configured to set a reminder for the television program when the at least one advertisement is selected.

17. The system of claim 10 wherein the processor is further configured to allow the user to navigate the highlight region between the program listings information in the program listings region and the advertisement in the other region by issuing a user control command.

18. The system of claim 10, wherein at least a substantial portion of the video for the given television channel is viewable simultaneously with the program listings information and the advertisement.

* * * * *

UNITED STATES PATENT AND TRADEMARK OFFICE
CERTIFICATE OF CORRECTION

| | | |
|---|---|---|
| PATENT NO. | : 8,613,020 B2 | Page 1 of 1 |
| APPLICATION NO. | : 11/371490 | |
| DATED | : December 17, 2013 | |
| INVENTOR(S) | : Knudson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 711 days.

Signed and Sealed this
Twenty-first Day of July, 2015

Michelle K. Lee
*Director of the United States Patent and Trademark Office*